US012730977B2

(12) United States Patent
Temraz et al.

(10) Patent No.: US 12,730,977 B2
(45) Date of Patent: Sep. 8, 2026

(54) SYSTEMS AND METHODS FOR AUTOMATED COMMUNICATION TRAINING

(71) Applicant: Infobip Ltd., London (GB)

(72) Inventors: Danijel Temraz, Zagreb (HR); Martina Ćurić, Zagreb (HR)

(73) Assignee: Infobip Ltd., London (GB)

( * ) Notice: Subject to any disclaimer, the term of this patent is extended or adjusted under 35 U.S.C. 154(b) by 437 days.

(21) Appl. No.: 18/312,353

(22) Filed: May 4, 2023

(65) Prior Publication Data

US 2024/0330597 A1 Oct. 3, 2024

Related U.S. Application Data

(60) Provisional application No. 63/493,375, filed on Mar. 31, 2023.

(51) Int. Cl.

| | |
|---|---|
| ***G06F 40/35*** | (2020.01) |
| ***G06F 16/3329*** | (2025.01) |
| ***G06F 40/279*** | (2020.01) |
| ***G06F 40/284*** | (2020.01) |
| ***G06F 40/30*** | (2020.01) |
| ***G06N 20/00*** | (2019.01) |
| ***H04L 51/02*** | (2022.01) |
| ***H04L 51/04*** | (2022.01) |
| ***H04L 51/216*** | (2022.01) |

(52) U.S. Cl.

CPC .......... *G06F 40/35* (2020.01); *G06F 16/3329* (2019.01); *G06F 40/30* (2020.01); *H04L 51/02* (2013.01); *H04L 51/04* (2013.01); *G06F 40/279* (2020.01); *G06F 40/284* (2020.01); *G06N 20/00* (2019.01); *H04L 51/216* (2022.05)

(58) Field of Classification Search

None

See application file for complete search history.

(56) References Cited

U.S. PATENT DOCUMENTS

| | | | | |
|---|---|---|---|---|
| 7,185,065 | B1 * | 2/2007 | Holtzman | G06F 21/31 709/217 |
| 9,787,838 | B1 * | 10/2017 | Lembersky | H04M 3/5191 |
| 11,475,374 | B2 * | 10/2022 | Polleri | G06F 16/211 |
| 11,562,121 | B2 * | 1/2023 | Bikumala | G06F 40/166 |
| 12,223,080 | B1 * | 2/2025 | Al-Rikabi | G06F 16/243 |
| 12,334,049 | B2 * | 6/2025 | Aharoni | G06F 40/216 |

(Continued)

OTHER PUBLICATIONS

Wikimedia Foundation. (Mar. 21, 2023). Active learning (machine learning). Wikipedia. Retrieved Apr. 27, 2023, from https://en.wikipedia.org/wiki/Active_learning_(machine_learning).

*Primary Examiner* — Richa Sonifrank

(74) *Attorney, Agent, or Firm* — Bookoff McAndrews, PLLC

(57) ABSTRACT

Systems and methods for generating data related to chatbot performance may include receiving a plurality of conversations between a chatbot and chatbot users, providing the plurality of conversations to a machine learning model trained to identify patterns based on the plurality of conversations, identifying patterns within the plurality of conversations based on an output of the machine learning model, displaying, using a graphical user interface (GUI), the identified patterns, and retraining the chatbot based on the identified patterns.

20 Claims, 42 Drawing Sheets

(56) References Cited

U.S. PATENT DOCUMENTS

| | | | | |
|---|---|---|---|---|
| 2014/0047315 | A1* | 2/2014 | Williams | G06F 16/38<br>715/230 |
| 2020/0175430 | A1* | 6/2020 | Kochura | H04L 51/02 |
| 2020/0344185 | A1 | 10/2020 | Singaraju et al. | |
| 2020/0372105 | A1* | 11/2020 | Gerges | G06F 40/232 |
| 2021/0256417 | A1 | 8/2021 | Kneller et al. | |
| 2021/0319461 | A1* | 10/2021 | Nanda | G06Q 30/0282 |
| 2022/0156468 | A1* | 5/2022 | Kim | G06F 40/237 |
| 2022/0335223 | A1 | 10/2022 | Tripathi et al. | |
| 2022/0394348 | A1* | 12/2022 | Hatambeiki | G06V 40/28 |
| 2023/0245651 | A1* | 8/2023 | Wang | G06N 5/022<br>704/275 |
| 2023/0259558 | A1* | 8/2023 | Subramaniam | G06F 11/3466<br>704/9 |
| 2023/0259714 | A1* | 8/2023 | Lange | G06F 40/237<br>704/9 |
| 2023/0274095 | A1* | 8/2023 | Kelkar | G06F 40/247<br>704/9 |
| 2023/0315856 | A1* | 10/2023 | Lee | G06N 3/08 |
| 2024/0330597 | A1* | 10/2024 | Temraz | G06F 40/35 |
| 2024/0386054 | A1* | 11/2024 | Wouhaybi | H04L 45/16 |
| 2024/0411990 | A1* | 12/2024 | Zhang | G06F 40/58 |
| 2025/0190475 | A1* | 6/2025 | Siebel | G06N 3/092 |

* cited by examiner

130

| LABEL NAME (130a) | SIZE (130b) | BALANCED SIZE (130c) | PERFORMANCE (130d) |
|---|---|---|---|
| ABM | 51 | OK | ✓ |
| ABOUT COMPANY | 50 | OK | ✗ |
| AGENT | 50 | OK | ✗ |
| CHAT APPS | 50 | OK | ✗ |
| CHATBOTS | 50 | OK | ✓ |
| CONVERSATIONS | 50 | OK | ✓ |

FIG. 1H

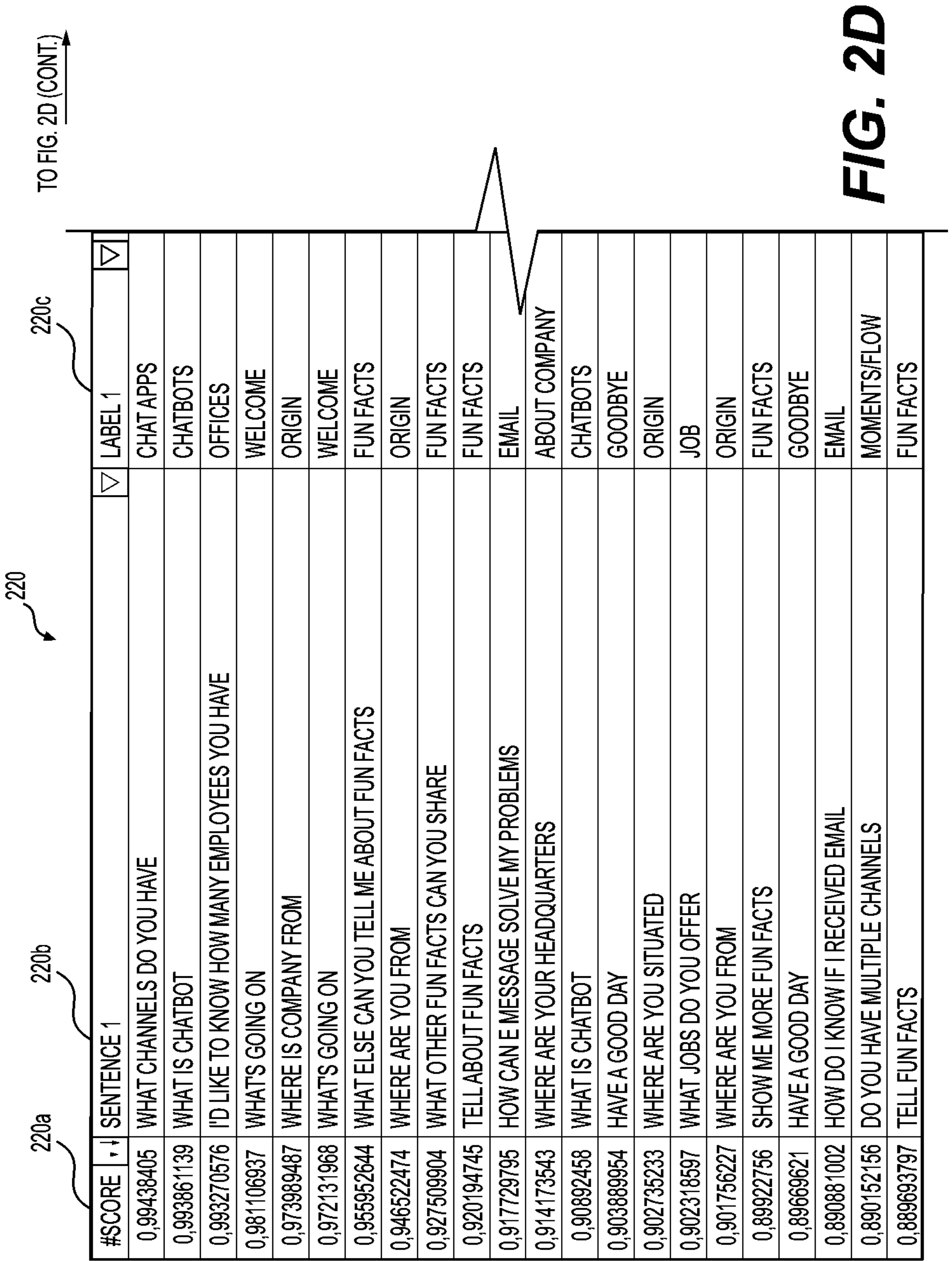

| #SCORE | SENTENCE 1 | LABEL 1 |
|---|---|---|
| 0,99438405 | WHAT CHANNELS DO YOU HAVE | CHAT APPS |
| 0,993861139 | WHAT IS CHATBOT | CHATBOTS |
| 0,993270576 | I'D LIKE TO KNOW HOW MANY EMPLOYEES YOU HAVE | OFFICES |
| 0,981106937 | WHAT'S GOING ON | WELCOME |
| 0,973989487 | WHERE IS COMPANY FROM | ORIGIN |
| 0,972131968 | WHAT'S GOING ON | WELCOME |
| 0,955952644 | WHAT ELSE CAN YOU TELL ME ABOUT FUN FACTS | FUN FACTS |
| 0,946522474 | WHERE ARE YOU FROM | ORIGIN |
| 0,927509904 | WHAT OTHER FUN FACTS CAN YOU SHARE | FUN FACTS |
| 0,920194745 | TELL ABOUT FUN FACTS | FUN FACTS |
| 0,917729795 | HOW CAN E MESSAGE SOLVE MY PROBLEMS | EMAIL |
| 0,914173543 | WHERE ARE YOUR HEADQUARTERS | ABOUT COMPANY |
| 0,90892458 | WHAT IS CHATBOT | CHATBOTS |
| 0,903889954 | HAVE A GOOD DAY | GOODBYE |
| 0,902735233 | WHERE ARE YOU SITUATED | ORIGIN |
| 0,902318597 | WHAT JOBS DO YOU OFFER | JOB |
| 0,901756227 | WHERE ARE YOU FROM | ORIGIN |
| 0,89922756 | SHOW ME MORE FUN FACTS | FUN FACTS |
| 0,89669621 | HAVE A GOOD DAY | GOODBYE |
| 0,890881002 | HOW DO I KNOW IF I RECEIVED EMAIL | EMAIL |
| 0,890152156 | DO YOU HAVE MULTIPLE CHANNELS | MOMENTS/FLOW |
| 0,889693797 | TELL FUN FACTS | FUN FACTS |

FIG. 2D

FROM FIG 2D 220d 220e

| SENTENCE 2 | LABEL 2 |
|---|---|
| WHICH CHANNELS DO YOU HAVE | COMPANY PRODUCTS |
| WHAT IS A CHATBOT | CHATBOT |
| I WANT TO KNOW HOW MANY EMPLOYEES YOU HAVE | NO. OF EMPLOYEES |
| WHAT IS HAPPENING | HOW ARE YOU |
| WHERE DOES COMPANY COME FROM | ABOUT COMPANY |
| WHAT'S BEEN GOING ON | HOW ARE YOU |
| WHAT ELSE CAN YOU TELL ME ABOUT FUNNY THINGS | JOKES |
| WHERE DO YOU COME FROM | ABOUT COMPANY |
| WHAT OTHER FUNNY STORIES CAN YOU SHARE | JOKES |
| TELL ABOUT FUNNY THINGS | JOKES |
| HOW CAN SMS SOLVE MY PROBLEMS | SMS |
| WHERE ARE YOUR OFFICES | OFFICES |
| WHAT ARE YOU A CHATBOT | CHATBOT |
| GOOD DAY | WELCOME |
| WHERE ARE YOU | HOW ARE YOU |
| WHAT SERVICES DO YOU OFFER | COMPANY PRODUCTS |
| WHERE ARE YOU | HOW ARE YOU |
| SHOW ME MORE FUNNY STORIES | JOKES |
| DOBAR DAN | WELCOME |
| HOW DO I KNOW IF I RECEIVED SMS | SMS |
| DO YOU HAVE DIFFERENT CHANNELS | COMPANY PRODUCTS |
| TELL FUNNY THINGS | JOKES |

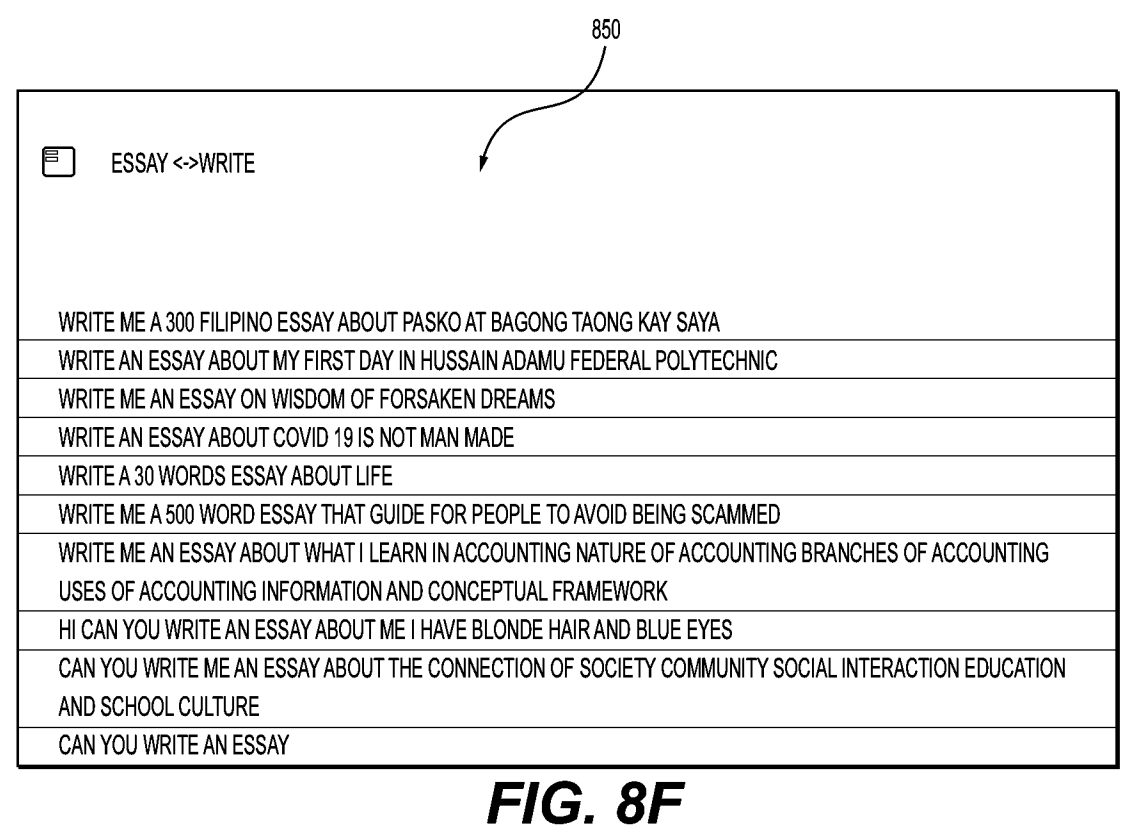

ESSAY <->WRITE

WRITE ME A 300 FILIPINO ESSAY ABOUT PASKO AT BAGONG TAONG KAY SAYA
WRITE AN ESSAY ABOUT MY FIRST DAY IN HUSSAIN ADAMU FEDERAL POLYTECHNIC
WRITE ME AN ESSAY ON WISDOM OF FORSAKEN DREAMS
WRITE AN ESSAY ABOUT COVID 19 IS NOT MAN MADE
WRITE A 30 WORDS ESSAY ABOUT LIFE
WRITE ME A 500 WORD ESSAY THAT GUIDE FOR PEOPLE TO AVOID BEING SCAMMED
WRITE ME AN ESSAY ABOUT WHAT I LEARN IN ACCOUNTING NATURE OF ACCOUNTING BRANCHES OF ACCOUNTING USES OF ACCOUNTING INFORMATION AND CONCEPTUAL FRAMEWORK
HI CAN YOU WRITE AN ESSAY ABOUT ME I HAVE BLONDE HAIR AND BLUE EYES
CAN YOU WRITE ME AN ESSAY ABOUT THE CONNECTION OF SOCIETY COMMUNITY SOCIAL INTERACTION EDUCATION AND SCHOOL CULTURE
CAN YOU WRITE AN ESSAY

*FIG. 8F*

SYSTEMS AND METHODS FOR AUTOMATED COMMUNICATION TRAINING

CROSS-REFERENCE TO RELATED APPLICATIONS

This application claims priority to U.S. Provisional Application No. 63/493,375 filed Mar. 31, 2023, the entire disclosure of which is hereby incorporated by reference in its entirety.

TECHNICAL FIELD

Various embodiments of the present disclosure relate generally to intent-based automated communication and, more specifically, to identifying patterns within conversations between intent-based chatbots and chatbot users for optimizing the chatbots.

BACKGROUND

Companies within many different industries use automated communication such as via chatbots as an initial contact point for customers that desire to interact with a company. A chatbot may allow for simple conversations or exchange of messages to occur between a chatbot and a chatbot user. Chatbots may simplify communication, improve user experience, and accelerate a path to a desired result for customers, all while saving valuable company resources such as support staff and infrastructure.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for generating data related to chatbot performance.

In one aspect, an exemplary embodiment of a method for generating data related to chatbot performance may include receiving a plurality of conversations between a chatbot and chatbot users; providing the plurality of conversations to a machine learning model trained to identify patterns based on the plurality of conversations; identifying patterns within the plurality of conversations based on an output of the machine learning model; displaying, using a graphical user interface (GUI), the identified patterns; and retraining the chatbot based on the identified patterns.

In another aspect, an exemplary embodiment of a method for generating data related to chatbot performance may include receiving a plurality of intents and a plurality of training phrases for training a chatbot, determining a correlation between the plurality of intents and the plurality of training phrases, determining a semantic similarity between individual phrases of the plurality of training phrases, generating a graphic depicting the semantic similarity between individual phrases of the plurality of training phrases and the correlation between the plurality of intents and the plurality of training phrases, and training the chatbot based on the semantic similarity.

In yet another aspect, an exemplary embodiment of a system includes a data storage device storing processor-readable instructions and a processor operatively connected to the data storage device and configured to execute the instructions to perform operations that may include receiving a plurality of conversations between a chatbot and chatbot users, identifying patterns within the plurality of conversations, displaying the identified patterns, and training the chatbot based on the identified patterns.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1H is a table of training data, according to one or more embodiments.

FIG. 2D is an example spreadsheet depicting similar overlapping phrases between intents, according to one or more embodiments.

FIGS. 8E-8H are GUIs depicting lists of messages related to word-pair concepts, according to one or more embodiments.

DETAILED DESCRIPTION OF EMBODIMENTS

Figure 1A:
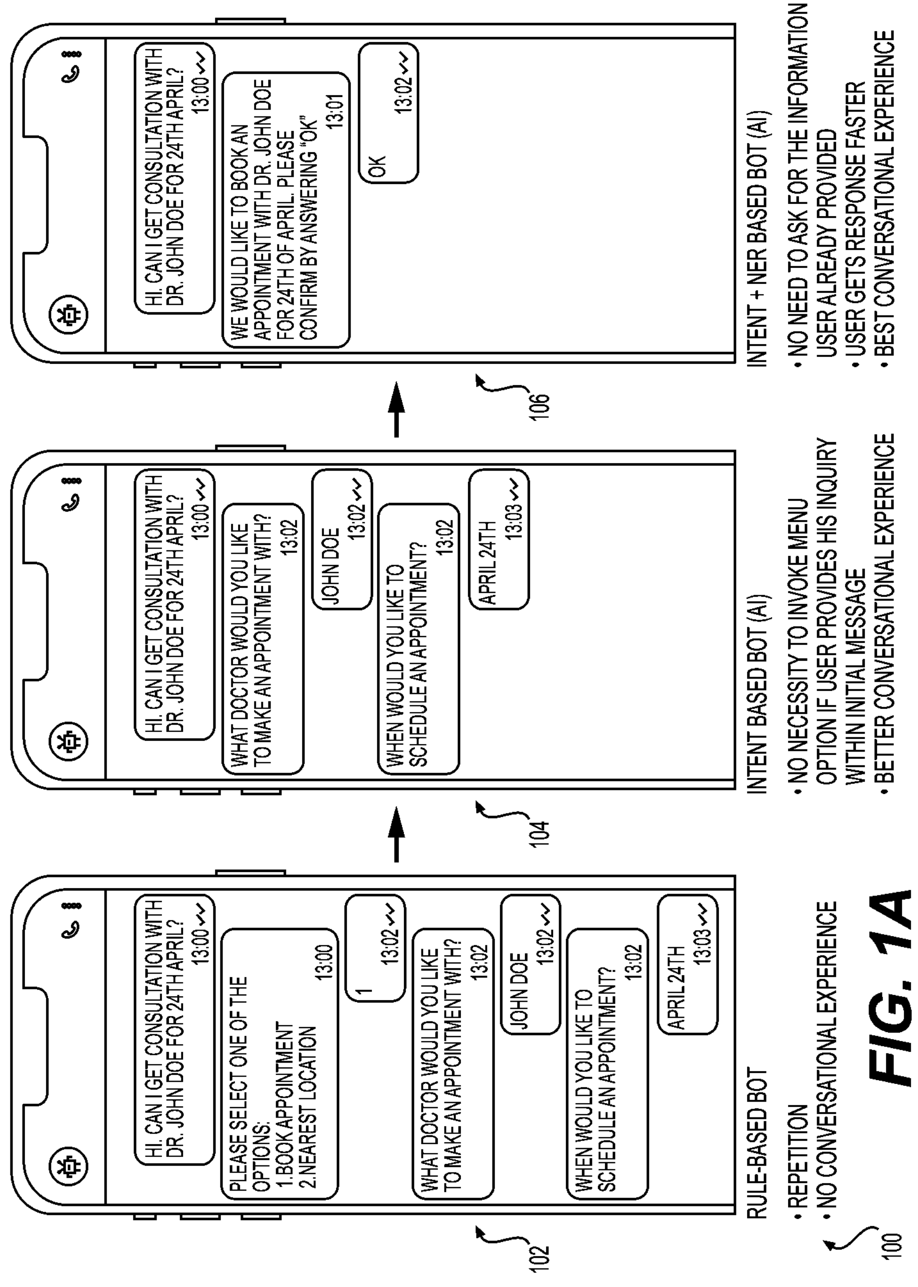
FIG. 1A depicts example bots, according to one or more embodiments.

The terminology used herein may be interpreted in its broadest reasonable manner, even though it is being used in conjunction with a detailed description of certain specific examples of the present disclosure. Indeed, certain terms may even be emphasized herein; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value. In this disclosure, the term "higher" refers to more, greater than, or up. In this disclosure, the term "lower" refers to below, less than, or down.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

According to certain aspects of the disclosure, methods and systems are disclosed for identifying patterns within conversations between intent-based automated communication modules (generally referred to as "chatbots" herein) and respective users. A chatbot may be implemented as a software component, a set of software instructions, a hardware component, a firmware component, and/or a combination of the same. As used herein, the term "intent" refers to the goal or topic associated with a communication (e.g. a question or comment provided during an interaction with a chatbot). Chatbots may be trained with a set of intents and communication (e.g., a set of phrases) that relate to each intent. The term "chatbot user" may refer to end users that interact with a chatbot in a "conversation" where messages are exchanged between the chatbot user and the chatbot. A high-quality chatbot may communicate with a chatbot user using a tone that is aligned with (e.g., selected by) the entity (e.g., company) using the chatbot to interact with customers. Chatbots may be implemented based on a dialog structure that may be created automatically and/or manually by administrators of the chatbot. Chatbots may be trained to operate in response to all or most of a respective customer's possible intents. It may be preferred that a given customer communication is not associated with overlapping intents, to minimize conflicting chatbot communication.

As discussed above, chatbots may be trained using sets of intents and respective communication (e.g., sets of phrases) that are related to each respective intent. Chatbots may be trained with a limited set of phrases that are associated with respective intents. In some cases, phrases that may be associated with an intent may be crowdsourced (e.g., using an artificial intelligence (AI) chatbot or a group of potential end users). Crowdsourcing may provide a greater variety and/or variation of possible phrases associated with respective intents. Such variety and/or variation in training may be used to implement a chatbot that is better able to determine the intent associated with a variety of possible chatbot user communications. A set of phrases corresponding to a particular intent may be one or more phrases generated or tagged by a chatbot administrator or machine learning model. In some cases, a production machine learning model trained based on such phrases may be used to determine intents based on input phrases and/or messages input by a chatbot user. A greater number of phrases used for training may generally result in greater chatbot accuracy (e.g., intent determination, responses, prompts, etc.). Chatbot accuracy may refer to a confidence and/or reliability with which a chatbot accurately identifies a chatbot user's intent (e.g., the intent associated with a given message provided by the chatbot user). As an example, a minimum of approximately 10 phrases may be used to train a chatbot for a given intent.

As another example, for greater accuracy, more than approximately 200 phrases may be used to train a chatbot for an intent. It will be understood that there may be no limit to the number of phrases that define an intent. Further, a greater diversity of phrases (e.g., diversity of types of phrases, diversity of language, diversity of words, etc.) may more accurately train a chatbot to determine the intent associated with a variety of messages received from a variety of chatbot users.

One example of an intent may be "customer success stories" (e.g., a chatbot customer may request examples of the entity's positive experiences with other customers). The following list of training phrases may be used to train the chatbot to identify such an intent: "what about your customers;" "can you show me customer stories;" "is ABC bank your client;" "tell me more about clients you are working with;" "case studies;" "show me customer stories;" "what success stories do you have." By using such a list of training phrases, using machine learning, a chatbot may be trained to determine the intent of the chatbot user (e.g., see customer success stories) based on an input from a chatbot user that is the same as, very similar, or otherwise correlated with the list of training phrases. For example, the chatbot may receive a chatbot user input and determine that the chatbot input is the same as or similar to a training phrase. The chatbot may determine the "customer success stories" intent based on a machine learning output classifying the user input with a most probable intent. As discussed herein, features extracted from the user input may be used to determine the most probable intent.

It may take time, effort, and resources to train a chatbot and it may be difficult to determine whether a chatbot meets requirements of user communication. It may also be difficult to retrain a chatbot following a period of use due to high volume of chat messages and no clear method to analyze the chat messages to identify patterns and trends in the messages. Techniques and systems disclosed herein are provided to analyze the performance of a chatbot and to efficiently train or re-train a chatbot (e.g., based on the analyzed performance of the chatbot). As discussed herein, chatbot communications may be analyzed to generate data for inspection and improvement of a chatbot. The systems and techniques discussed herein may also provide for a self-learning chatbot that iteratively applies its own data and retrains itself based on the data collected from its own messages with chatbot users, without manual intervention of a chatbot administrator. The systems and techniques provided herein may provide implementation of a chatbot that is better at determining an intent of a chatbot user, while using less resources, in comparison to traditional techniques. A chatbot that is better trained to identify intent may communicate with chatbot user in a manner that leads to increased customer satisfaction (e.g., an increased customer satisfaction (CSAT) score (e.g., measured on a scale such as 1-5, 1-10, etc., as may be provided by a user) with the respective chatbot entity. This increased customer satisfaction may lead to a higher conversion rate with better business results for the chatbot administrator. The techniques and systems disclosed herein may result in greater intent coverage and conversational experience for end users.

Aspects of the techniques and systems disclosed herein may be implemented using a machine learning model. The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

According to aspects of the present disclosure, data related to chatbot performance of a trained or semi-trained chatbot may be generated. A plurality of historical conversations between a chatbot and chatbot users may be received. The historical conversations (e.g., messages) may be stored in a memory (e.g., a server), and may be retrieved for analysis. Each historical conversation may include respective metadata such as an identifier number, the time and date of the conversation, an address (e.g., public IP address) of the chatbot user, and/or identifiers of other related conversations between respective chatbot users and the chatbot. A chatbot analysis system may receive the historical conversations between the chatbot and the chatbot users for a predefined period of time. Patterns in the conversations may be identified by the system (e.g., using a machine learning model trained to identify patterns based on other historical or simulated tagged or untagged conversations). The system may display (e.g., for a chatbot administrator) the identified patterns (e.g., via a graphical user interface (GUI)). The term "chatbot administrator" may refer to a creator, builder, and/or administrator of a particular chatbot. A chatbot administrator may refer to an individual or company that uses the chatbot to interact with customers. The chatbot administrator may use the identified patterns to retrain the chatbot to increase its effectiveness in communicating with customers and clients, as further discussed herein.

FIG. 1A depicts example bots (e.g., chatbots) 100, according to one or more embodiments. As shown in FIG. 1A, a chatbot may be a rule-based chatbot as depicted in example GUI 102, an intent based chatbot as depicted in example GUI 104, and/or an intent and named entity recognition (NER) based chatbot as depicted in example GUI 106, in accordance with the techniques further disclosed herein.

Figure 1B:
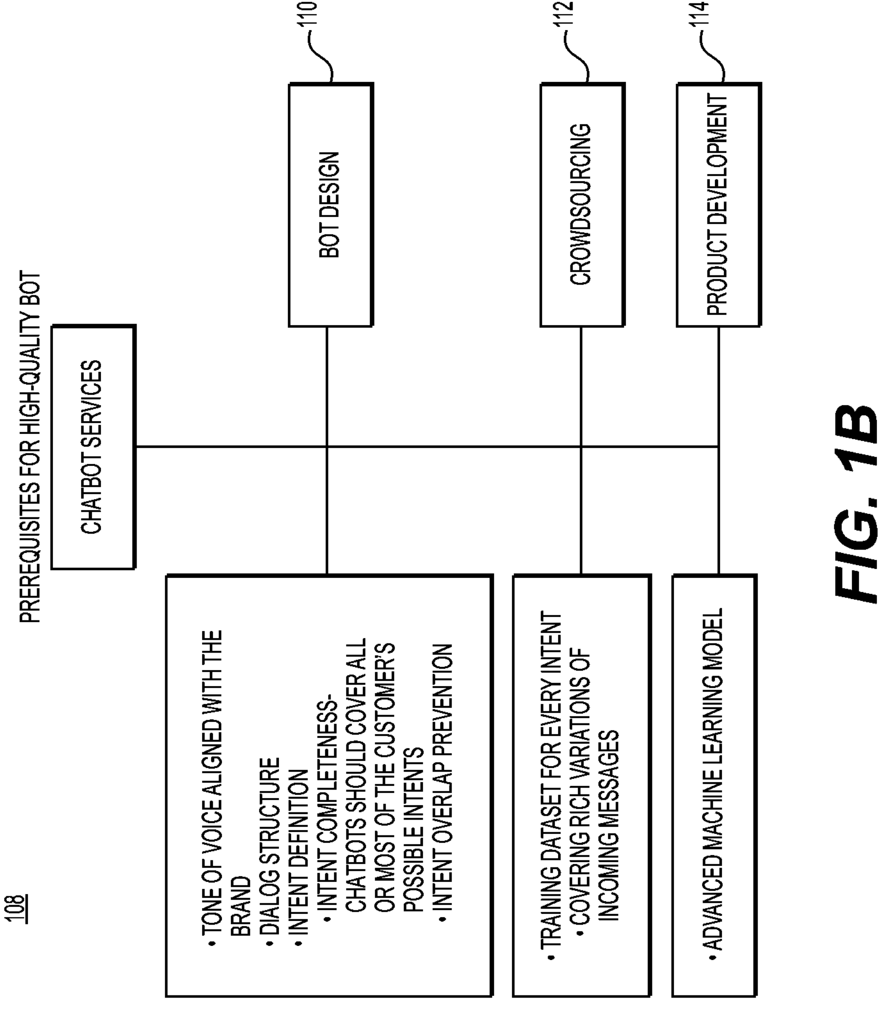
FIG. 1B is a flow diagram for chatbot development, according to one or more embodiments.

FIG. 1B is a flow diagram 108 for chatbot development, according to one or more embodiments. As shown in FIG. 1B, chatbot development may include chatbot design 110 (e.g., based on tone, dialog structure, intent definition, etc.), training 112 (e.g., based on crowdsourcing), and/or product development 114 (e.g., based on a machine learning model).

Figure 1C:
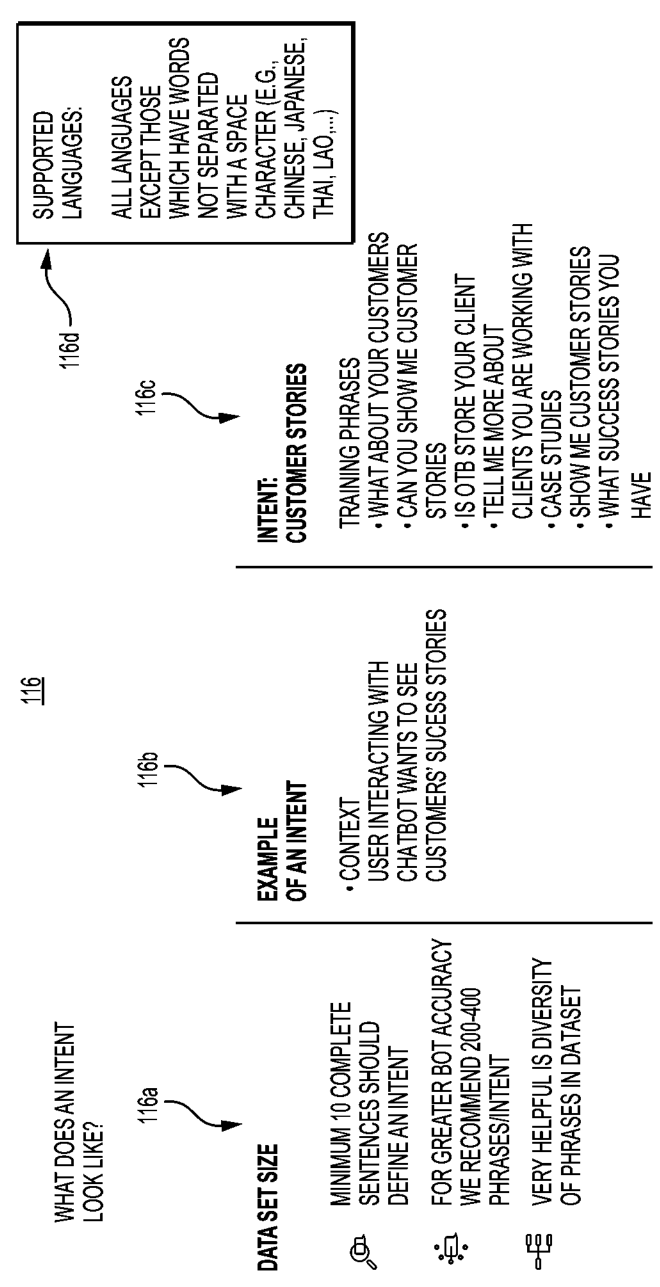
FIG. 1C is an overview of intent, according to one or more embodiments.

FIG. 1C is an overview 116 of intent, according to one or more embodiments. As further discussed herein, intents may be determined based on a data set (e.g., sentences, phrases, etc.) that may be associated with a given intent (e.g., "customer success stories"). As shown at 116*a*, in some embodiments, a data set may include approximately ten complete sentences to define an intent. Additional and/or diverse sentences and/or phrases may result in greater chatbot accuracy. An example of an intent and training phrases is shown at 116*b* and 116*c*, respectively. Additionally, in some embodiments, languages supported may be limited to languages which have words that are separated by a space character, as shown at 116*d*.

Figure 1D:
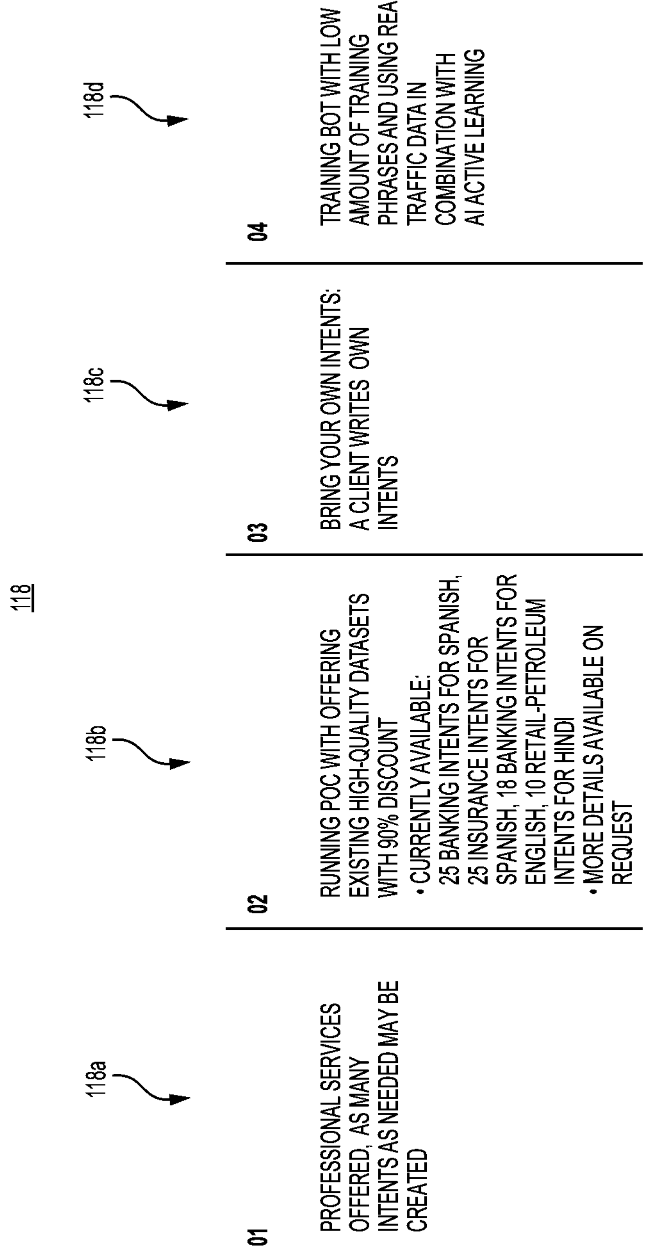
FIG. 1D is a flow diagram for generating intents, according to one or more embodiments.

FIG. 1D is a flow diagram 118 for generating intents, according to one or more embodiments. As shown at 118*a* in FIG. 1D, a service to generate an intent-based chatbot may provide intents and training phrases for chatbot administrators. At 118*b*, examples of datasets including intents are disclosed. In some embodiments, a chatbot administrator (e.g., a customer of the service to generate an intent-based chatbot) may create additional intents, as shown at 118*c*. According to an embodiment, and as shown at 118*d*, a chatbot may be trained with a sample of training phrases generated, for example, using real chat data, in combination with active learning, as disclosed herein. According to an embodiment, crowdsourcing may be used to gather intents and corresponding queries to train a chatbot.

Figure 1E:
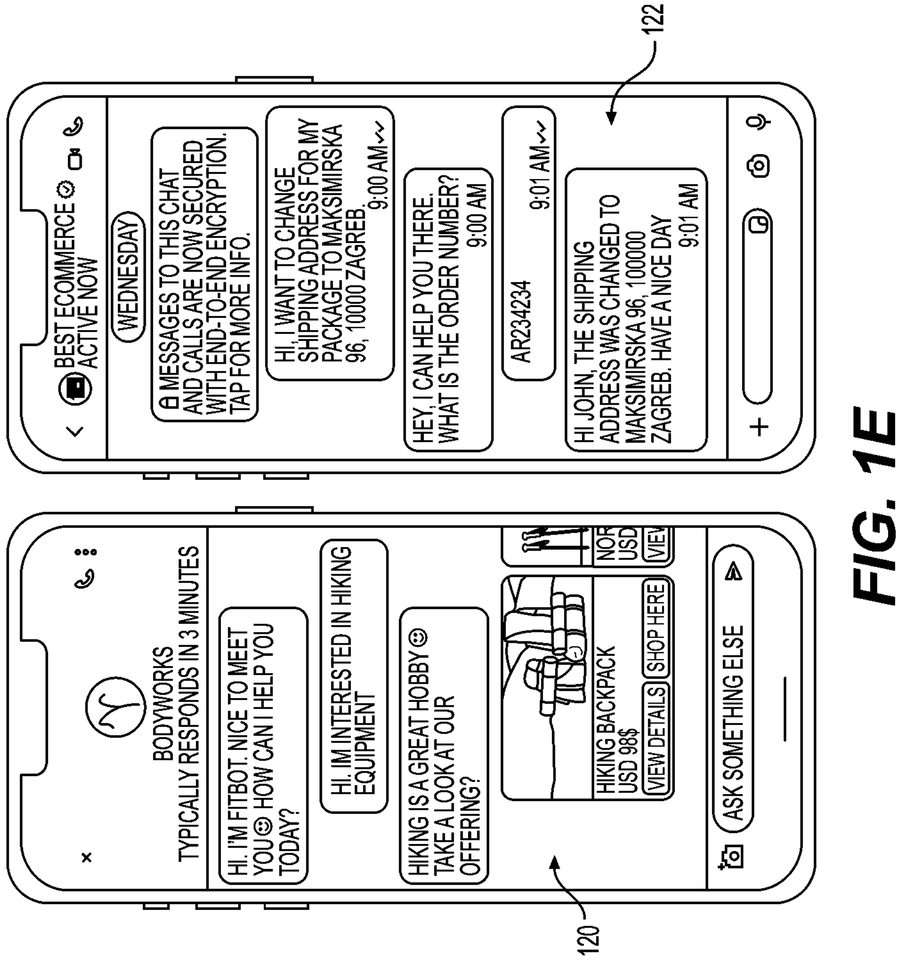
FIG. 1E is an example chatbot use case, according to one or more embodiments.
Figure 1F:
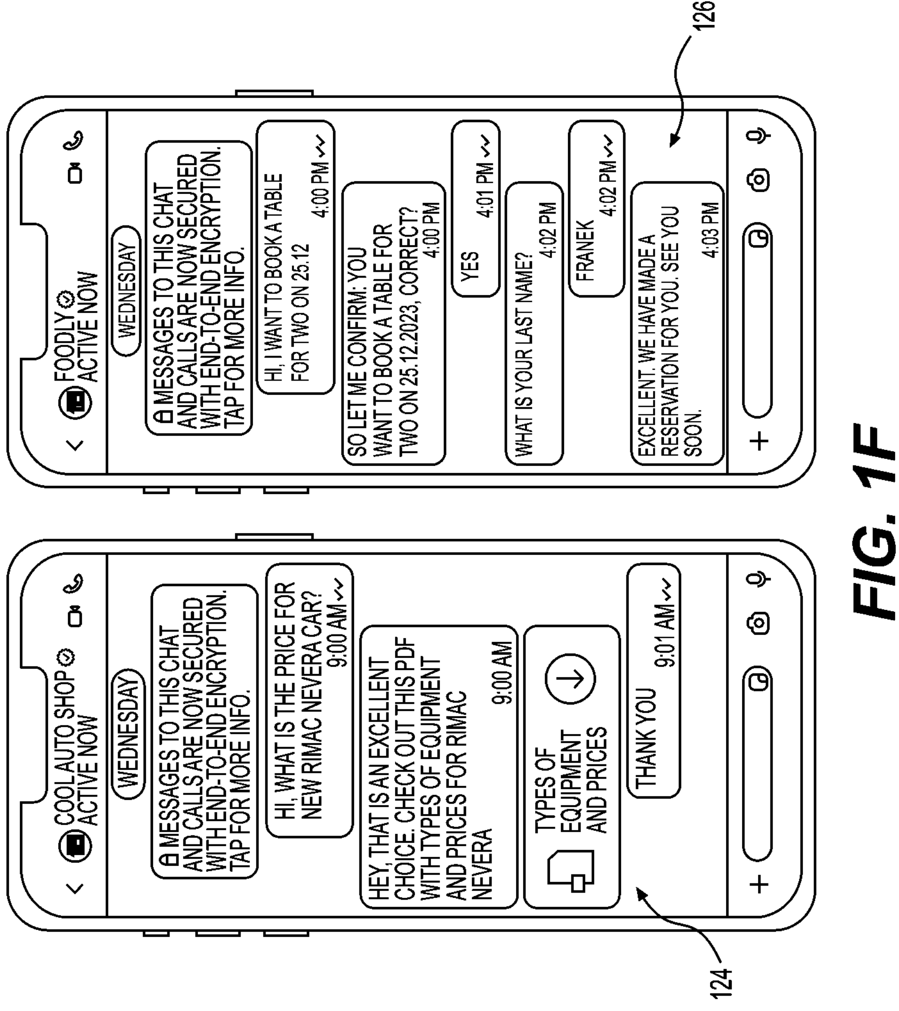
FIG. 1F is another example chatbot use case, according to one or more embodiments.
Figure 1G:
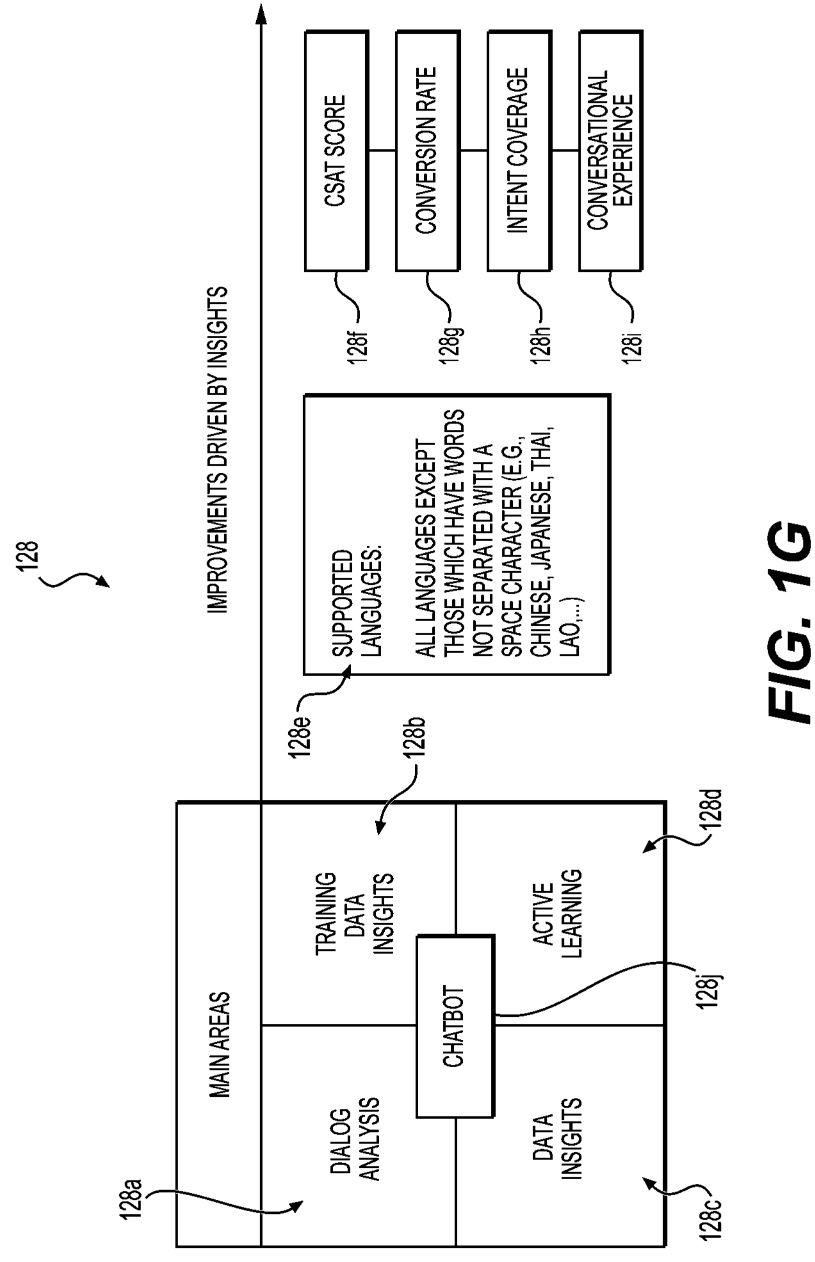
FIG. 1G is a flow diagram insights to improve chatbots, according to one or more embodiments.

FIGS. 1E and 1F show example chatbot use cases, according to one or more embodiments. For example, FIG. 1E shows example GUIs 120 and 122, while FIG. 1F shows example GUIs 124 and 126. FIG. 1G is a flow diagram 128 showing insights to improve chatbots (e.g., chatbot 128*j*), according to one or more embodiments. As shown in FIG. 1G and further discussed herein, dialog analysis 128*a*, training data insights 128*b*, data insights 128*c*, and/or active learning 128*d* may be used to generate and/or retrain a chatbot. Chatbots may be generated for supported languages 128*e* and may be implemented to improve scores (e.g., CSAT score 128*f*), conversion rates 128*g*, intent coverage 128*h*, and/or conversational experience 128*i*.

FIG. 1H is a table 130 of training data, according to one or more embodiments. As shown, training data sets may have a corresponding labels, sizes, balance information, and performance information. Label names are shown in column 130*a*, size information is shown in column 130*b*, balance information is shown in column 130*c*, and performance information is shown in column 130*d*. Performance for each intent may be measured and problems may be detected (e.g., an intent is too small to be effective). Proposed actions may be generated if a problem is detected. A user may select each specific intent to get more detailed information and possible actions discussed in the training data analysis.

Figure 1I:
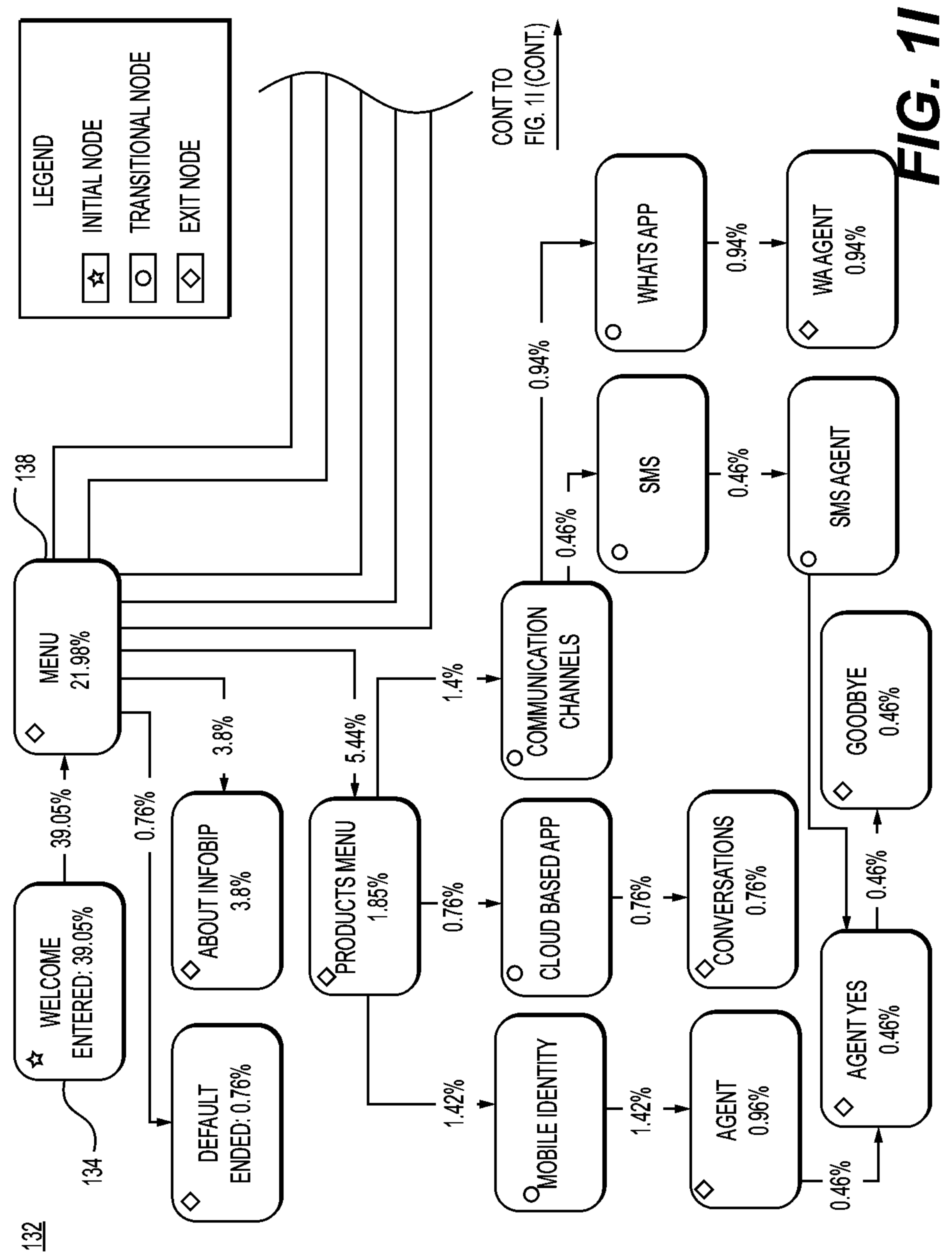
FIG. 1I is a graph depicting conversation paths and conversation path exits points, according to one or more embodiments.
Figure 1I:
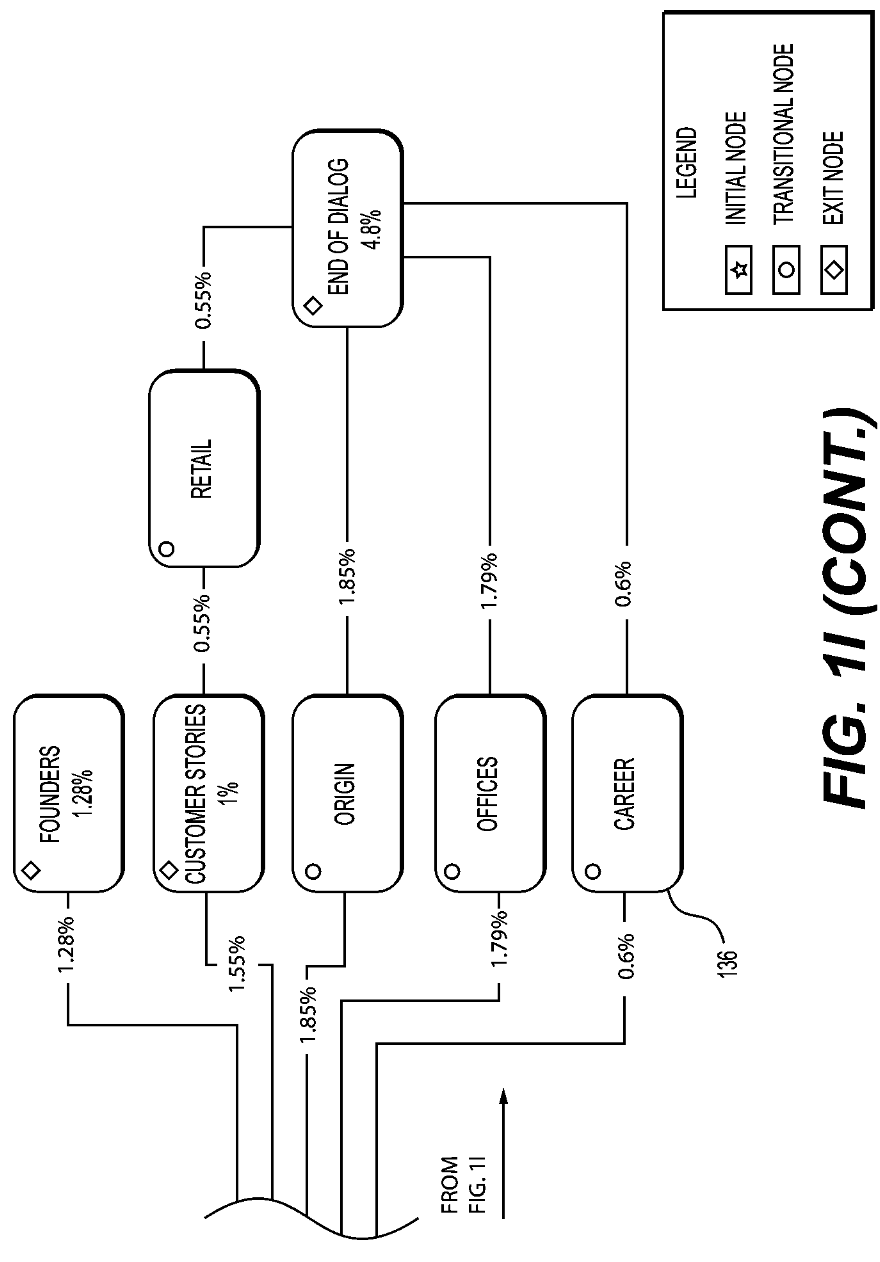

FIG. 1I shows a graph 132 depicting conversation paths and conversation exit points. According to aspects of the present disclosure, conversations (e.g., chat sessions) between a chatbot and a chatbot users may be analyzed. The term "conversation" or "chat session" may refer to an exchange of messages between a chatbot and a chatbot user within a given session or period of time. A conversation may begin with an initial message from a chatbot user to a chatbot, or from a chatbot to a chatbot user. The chatbot may interpret the message from the chatbot user to determine the intent associated with the message and to respond with an AI-generated response or with a response predefined by a chatbot administrator. As shown in FIG. 1I, one or more graphs (e.g., graphics) may be generated to depict how chatbot users interact with the chatbot, where the chatbot users exit the conversations, and/or conversion rates associated with the chatbot.

Some chatbots may have hundreds or thousands of unique conversation paths. Each user session may generate at least one conversation path, and unique conversation paths across multiple users may be identified. It may be difficult for a chatbot administrator to fully understand how chatbot users are interacting with the chatbot without automatic analysis and visualization of the interactions, as discussed herein. According to an implementation, a subset of a total number of conversations may be identified for analysis. For example, a machine learning model may receive the plurality of conversations associated with a chatbot and may determine the subset of conversations that meet an overlap threshold. The machine learning model may be trained based on historical or simulated conversations and may further be trained based on tags associated with, for example, overlap thresholds, initial nodes, transitional nodes, and/or exit nodes for the historical or simulated conversations. The overlap threshold (e.g., based on a number most visited paths) may be user determined (e.g., a chatbot administrator may specify the number of top N most visited paths to analyze) or may be determined by the machine learning model based on training to identify a representative subset of the conversations. For example, the machine learning model may identify approximately 70% of the conversations that represent 90% of the conversation paths associated with the chatbot. Accordingly, the 70% of the conversations may be used to output the conversation paths shown in FIG. 1I, for an example chatbot. According to an embodiment, the machine learning model may determine an overlap threshold based on a degree of fall in representation rate (e.g., representation rate R) corresponding to a next iterative change in a number or percent of conversations (e.g., percent change C). For example, the machine learning model may determine the overlap threshold based on a change in an overlap value based on a given R (e.g., 4%) for a next iterative C (e.g., 69% of conversations). The representation rate R may be determined by the machine learning model (e.g., based on training) or may be provided by a chatbot administrator.

During a chatbot conversation, a chatbot user may perform actions that transfer the chatbot user to another dialog of the chatbot conversation or may successfully end a chatbot conversation. A chatbot user may also perform actions or cease communication such that the user stays within a given dialog (e.g., without resolution of a user request). Such an action or ceasing of communication may be an example of an unsuccessful conversation exit point. As discussed above, analyzing a subset of conversations (e.g., twenty conversations) corresponding to the most accessed conversation paths may yield in the identification of the representative conversations with the chatbot and the respective conversation paths (e.g., as shown in FIG. 1I). A conversation path may include an ordered sequence of dialog transitions. To determine the subset of representative conversations, the chatbot analysis system may count occurrences of each conversation path for all chat sessions, identify the top N paths (e.g., the most common conversation paths, based on an overlap threshold), group the top N paths by their starting dialog, and for each group/starting dialog, generate a directed graph including the grouped paths, as shown in graph 132 of FIG. 1I. Each starting dialog may be interpreted as a separate funnel. Therefore, conversation paths may be grouped by their starting dialog and the graph shown in FIG. 1I may be generated for each funnel. In some embodiments, the following may be used by the chatbot analysis system: a list of chatbot user sessions, each of the chatbot user sessions including a dialog identifier and/or a timestamp; and/or a symbol table of dialog identifiers and dialog name. In some cases, the timestamp may not be used, such as if the chatbot analysis system stores chat session dialogs in ordered form.

As shown in FIG. 1I, a graph 132, may be generated that visually depicts one group (e.g., a funnel) of conversation paths which all share the same starting dialog. Initial nodes, such as welcome dialog 134, may represent a starting node and may include a percentage or ratio of chatbot users which started a chat session from the starting dialog node. A transitional node, such as career node 136, may indicate where chatbot users transitioned to a subsequent dialog. An exit node, such as menu dialog 138, may indicate a conversation exit point (e.g., a terminal dialog) representing a dialog where users exit the conversation path. An exit node may be a successful exit node (e.g., where the user transitioned to an intended subsequent dialog or where the user ended a conversation in an intended manner) or an unsuccessful exit node. For example, an unsuccessful exit node may correspond to users failing to respond or closing the chat session. Hovering over or clicking on a node in the GUI may display additional more detailed information, such as a ratio of users which entered a node, quit the conversation at the node, or remained at the node. Edges of the graph 132 may display a ratio of chatbot users that made the transition from one dialog node to the next. By way of example, FIG. 1I shows that approximately 39% of chatbot users entered a chat session with the chatbot at the "welcome" dialog 134. All 39% of chatbot users were directed to the "menu" dialog 138, where 21.98% of the users exit. The remaining chatbot users that did not exit at this point moved to adjacent dialogs with ratios of chatbot users displayed on the edges. Other than the funnel graph 132 shown in FIG. 1I, the chatbot analysis system may provide overview information such as a total number of paths, a number of unique paths, and a ratio of paths covered with the top N paths.

A chatbot administrator or automated system may use graph 132 of FIG. 1I to identify points where chatbot users have unsuccessful exits. An unsuccessful exit point may include instances where a chatbot user does not obtain the information that was desired upon commencing the chat session. A chatbot administrator or automated system may retrain the chatbot based at least partially on the identified unsuccessful exit points. For example, a machine learning model may retrain the chatbot based on phrases associated with the unsuccessful exit points. The phrases associated with the unsuccessful exit points may be used to train the chatbot to identify intents associated with those phrases and/or additional phrases, as further discussed herein. Alternatively, or in addition, new or updated chatbot dialog paths may be identified based on existing, new, or updated intents to better direct the responses generated by the chatbot in response to the phrases.

In some embodiments, terminal dialogs (e.g., conversation exit point nodes) may be visually distinguished (e.g., colored or bolded) to indicate a stronger emphasis on those with a larger of ratio of chatbot users that exit relative to those that entered. Heat maps may be used to show distinct paths relative to the ratio of chatbot users taking the distinct paths. In one or more embodiments, successful paths and expected paths may be displayed with distinguishing visual indications.

In some embodiments, actions of the chatbot analysis system may be executed inside dialogs which may not cause transition to other dialogs as this may be dependent on chatbot design. If the chatbot does not recognize user input or receive an expected response, the chatbot may stay in the same dialog and request a new input from the user. As an example, a user may attempt to book a ride with a taxi service using a chatbot. The chatbot may request an exact destination address, but the inputted address may not be recognized by the chatbot. Accordingly, the chatbot may remain in the same dialog and ask for the address again. Terminal dialogs (e.g., exit points) may include further indications based on additional information about executed actions representing successful exit points or unsuccessful exit points (e.g., user feedback, user indication of a successful or unsuccessful communication, user action to make a purchase, etc.). The top N conversation paths may be dynamically adjusted to include at least a certain percentage of total paths (e.g., based on new or updated conversations).

In some embodiments, an image of graph 132 generated according to techniques disclosed in reference to FIG. 1I may be provided to a generative multimodal large language model (LLM) for interpretation and analysis. A multimodal large language model may be a type of machine learning system that may understand and/or generate content in multiple modes, such as text, images, and audio. While traditional language models may be trained based on text data, multimodal language models may be trained on multiple types of data such as text, images, and/or audio, which may allow them to understand and generate content that is more diverse and nuanced, may be better suited for different types of tasks and/or applications. For example, a chatbot administrator or automated system may provide an image of graph 132 of conversation paths and/or a description of related intents to the multimodal LLM. The multimodal LLM may analyze the provided image and/or text and respond with a suggestion regarding which dialogs may be causing unsuccessful exit points (e.g. above a threshold amount). The multimodal LLM may also provide suggestions regarding which conversation paths are too long (e.g., above a length threshold), which may lead to unsuccessful exit points due to chatbot users not achieving their objective fast enough, or the like. The suggestions may be automatically applied to the training data the chatbot may be retrained based on the suggestions. In some cases, the training data may be automatically updated and the chatbot automatically retrained without intervention or confirmation from the chatbot administrator.

Figure 1J:
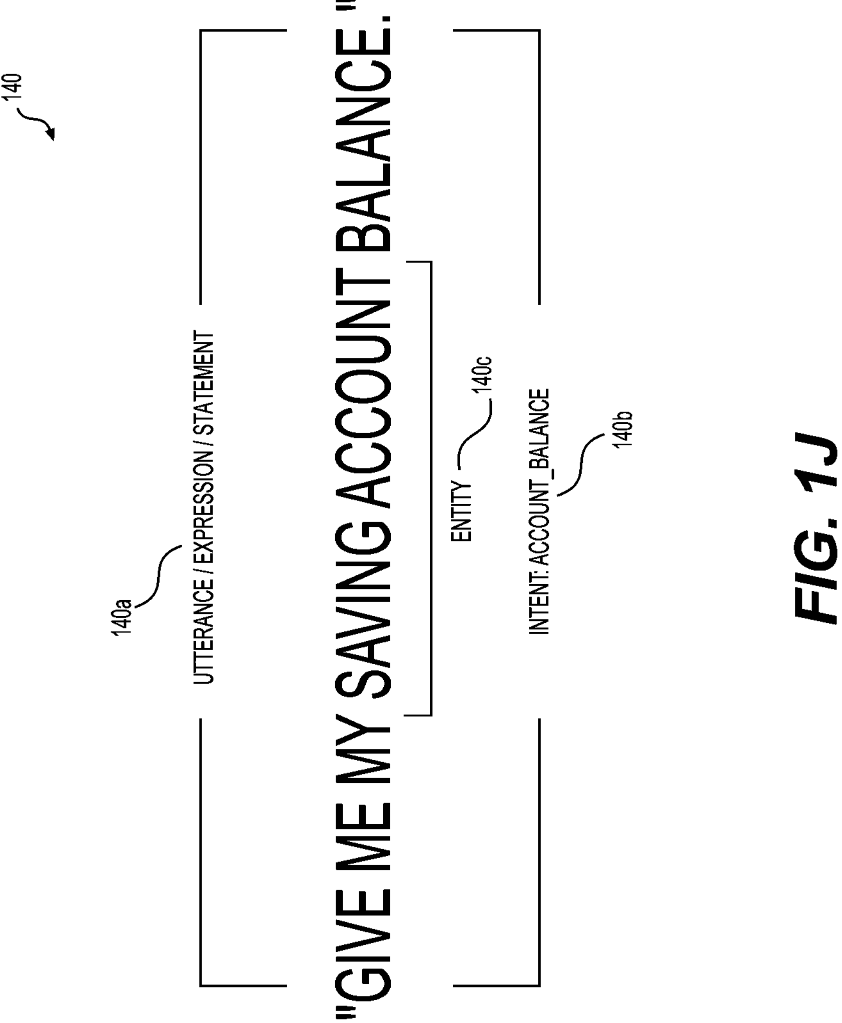
FIG. 1J is a diagram depicting an example entity associated with a phrase and an intent, according to one or more embodiments.

An NER attribute may be used to determine an intent and/or determine one or more specific actions (e.g., chatbot responses) based on the intent. NER may refer to a process of extraction of supported entities from user messages. For example, as shown in an example in diagram 140 of FIG. 1J, NER attributes that may be determined based on a chatbot conversation may include city, country, currency, date, day of week, number, relative date, and/or the like or a combination thereof. Other custom attribute types may be created and a chatbot may be trained to identify NER attributes from the text of the user message and/or information associated with the user (e.g., based on a user profile). As shown in FIG. 1J, "give me my saving account balance" may be an example of an utterance/expression/statement **140*a* that a chatbot user sends as a message to a chatbot. The chatbot may determine that the intent 140*b* associated with the input phrase is "account balance." The chatbot may also determine that a supported entity 140*c*** extracted via NER is "saving account."

Figure 1K:
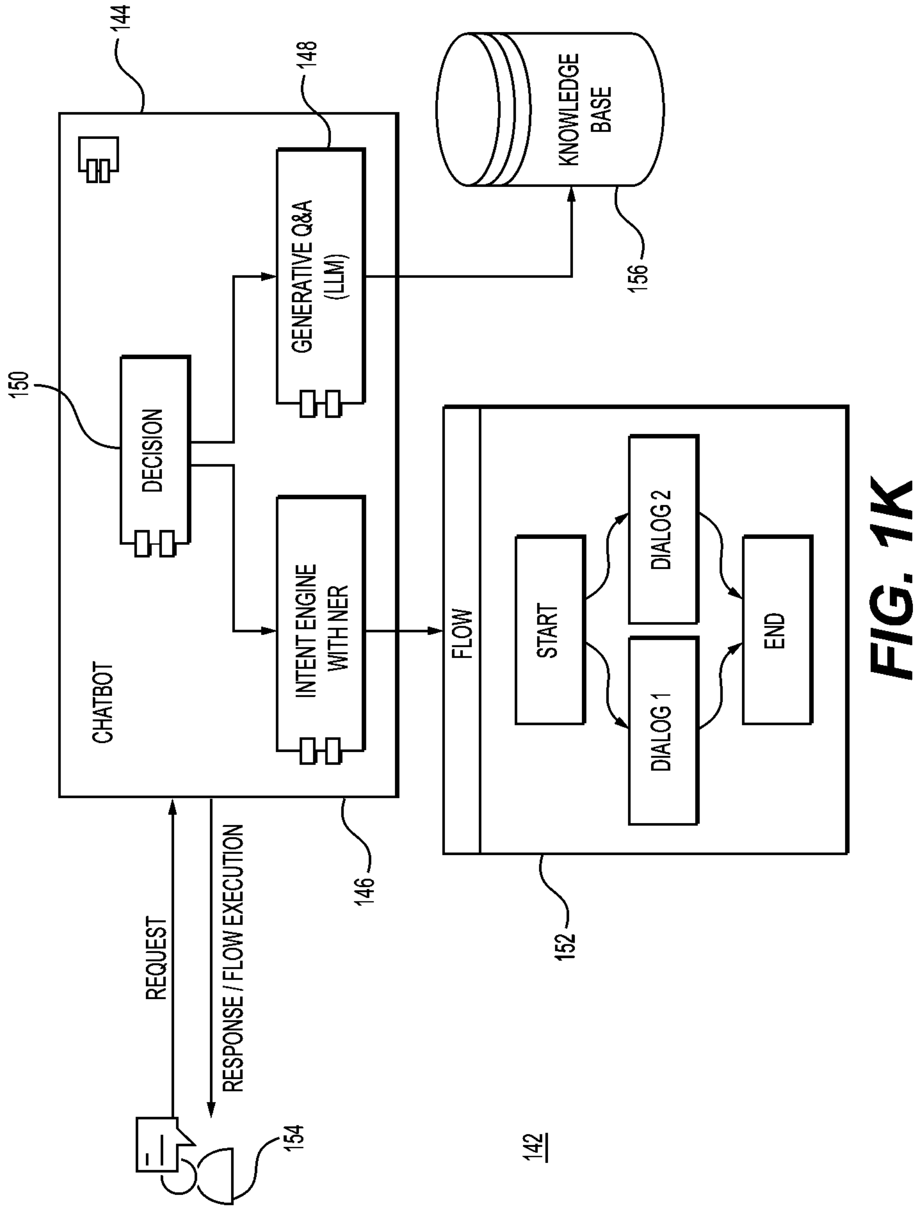
FIG. 1K is a diagram depicting a chatbot system, according to one or more embodiments.

FIG. 1K is a diagram depicting a chatbot system 142, in accordance with one or more embodiments. A chatbot 144 may include for example, up to three modules such as an intent engine module 146, a generative question and answer (Q&A) module 148, and/or a decision module 150. The intent engine module 146 may be trained to perform intent and named entity recognition (NER). When an intent or named entity is recognized or determined, a predefined flow 152 (e.g., a conversation path predefined by a chatbot administrator) may be executed. For example, a chatbot user 154 may desire to execute an action via the chatbot 144 such as book an appointment, check an order status, or make a payment. Each of these examples may have a fixed predefined dialog conversation flow that the chatbot 144 follows. An example of a predefined flow is illustrated in FIG. 1E, where example GUI 120 shows a user asking a chatbot for information about a specific product (e.g., hiking equipment) and the chatbot intent engine module 146 may direct the chatbot user 154 to a product offering matching the requested product.

Generative Q&A module 148 may provide generative Q&A capabilities using an LLM and handle responses to questions for which an answer may be found in a connected knowledge database 156. Upon receiving a chatbot message from a chatbot user 154, the decision module 150 may determine which module should handle the chatbot message, the intent engine module 146 or the generative Q&A module 148. In some cases, the decision module 150 may be another machine learning model that is trained to determine whether the message can be handled by the intent engine module 146 or whether the Q&A module 148 is better-suited to handle the request within the message. In some cases, a default may be to transmit the message to the intent engine module 146 but if no clear intent is determined, then the message may be handled by the generative Q&A module 148.

Figure 2A:
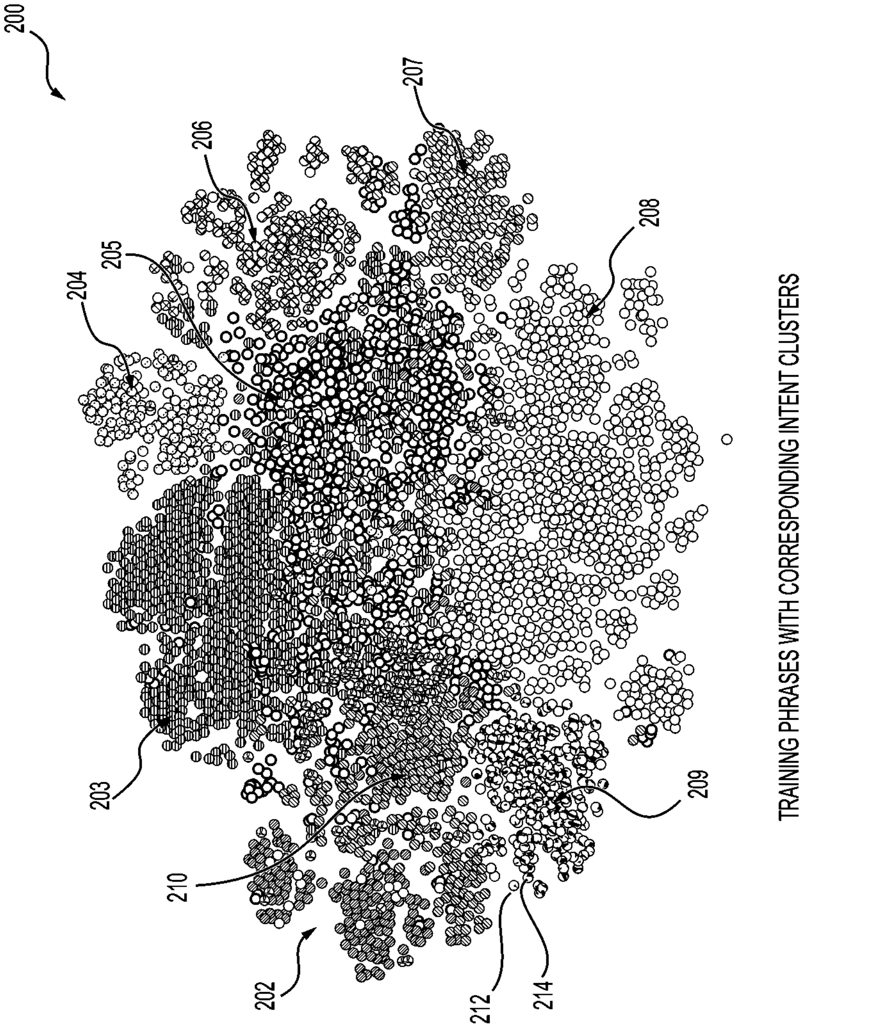
FIGS. 2A and 2B are plots depicting a quality of a training data set, according to one or more embodiments.
Figure 2B:
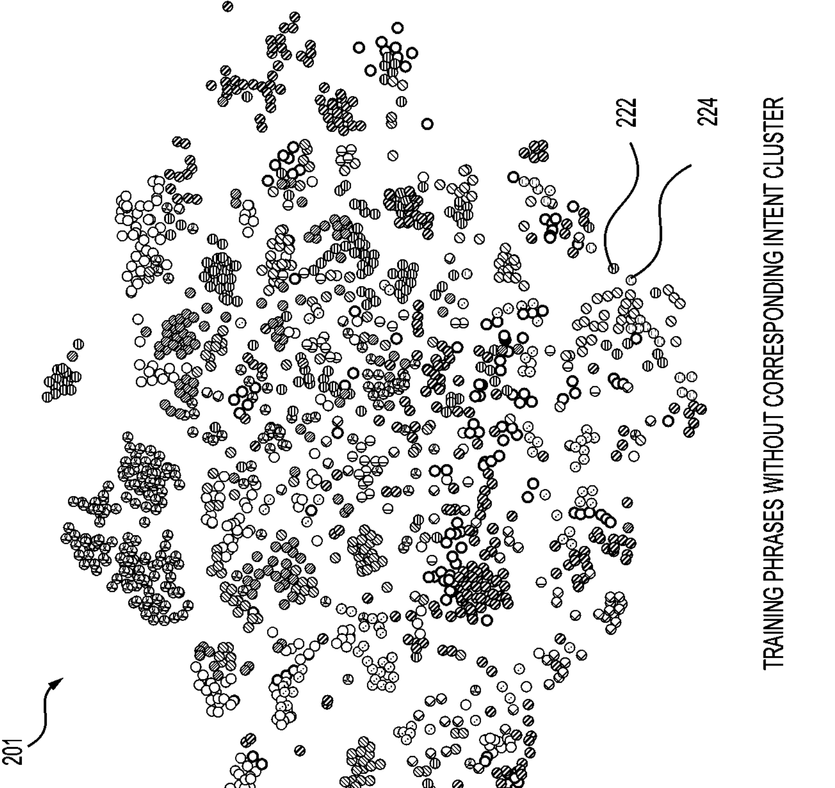

FIGS. 2A and 2B show plots 200 and 201, respectively, depicting a quality of a training data set based on training phrases and corresponding determined intent. A chatbot administrator may input training data into a tool (e.g., via an interface, via an application programing interface (API), etc.) that determines a quality of determined intents based on corresponding training phrases used to determine the intent. For example, FIG. 2A and FIG. 2B show plots 200 and 201, respectively, that depict training phrases and corresponding intent. Each dot represents a training phrase. The location of each dot is determined by its semantic (e.g., lexical or syntactical) structure. Training phrases with similar semantic structures may be located very near to each other regardless of the resulting determined intent. The intent associated with a given dot may be represented by the shade of the respective dot.

As discussed herein, a well-trained model may mitigate or prevent overlap of intents such that similarly categorized phrases may be associated with the same or similar intent. FIG. 2A shows an example plot 200 of a well-trained model. As shown in FIG. 2A, each visually distinct cluster 202-210 (e.g., each cluster having the same or similar shade) represents a separate intent. Accordingly, similar phrases are shown to be associated with the same or similar intent. For example, a dot 212 may represent the phrase "what time is it," and an adjacent dot 214 may represent the phrase "time?" As shown in FIG. 2A, both dots 212 and 214 may have the same shade representing the intent associated with requesting a current time.

FIG. 2B shows an example plot 201 of a poorly-trained model. As shown in FIG. 2B, the intents, represented by respective varied shading, are not clustered. Plot 201 may indicate that similar phrases may be associated with different intents (e.g., overlapping intent), which may result in unintended communication by a chatbot. For example, a first training phrase represented by dot 222 may be "how to get to the doctor" while another phrase represented by dot 224 may be "how to get a doctor." These phrases may be determined to be semantically similar by the model that the plot 201 of FIG. 2B is based on and the dots on the plot 201 representing these phrases may be very close together. However, the intent of these two phrases are different. The first phrase (dot 222) may correspond to an intent of needing directions to, or an address for, the doctor. The second phrase (dot 224) may correspond to an intent of finding a new doctor. Therefore, these intents may overlap with these two training phrases determined to be semantically similar, which may lead to undesired results for the communication by the corresponding chatbot.

A chatbot administrator may be provided a plot generated in accordance with the techniques disclosed in reference to FIGS. 2A and 2B, and determine if any corrective action should be taken to retrain the chatbot with different training phrases and intents. Alternatively, a machine learning model may output a flag to retrain a chatbot based on such a plot and/or the associated data. The data provided via such plots may be visualized for an understanding of whether certain intents overlap (e.g., by greater than an overlap threshold), which may trigger a retraining of the chatbot. Checking the performance of trained intents and highlighting underperforming intents may help the chatbot administrator or automated system (e.g., a machine learning model) to take corrective action. Similar intents may be visualized together, as further discussed herein in reference to FIG. 2C. Overlapping intents and corresponding phrases are further discussed herein in reference to FIG. 2D.

In some cases, a plot (e.g., a T-distributed Stochastic Neighbor Embedding (t-SNE) plot) generated according to techniques disclosed in reference to FIGS. 2A and 2B may be provided to a generative multimodal LLM for interpretation. For example, a chatbot administrator or automated system may provide the plot (e.g., an image of the plot) of visualized training data and/or a description of applicable intents and/or examples of applicable intents to the generative multimodal LLM. The generative multimodal LLM may analyze the provided image and/or text and respond with a suggestion to merge similar intents and/or propose entities/keywords that may be used to differentiate intents after merging. The multimodal LLM may be configured to determine a similarity between intents from the plot (e.g., an image of the plot) and may not require the text associated with the intents or training phrases for successful analysis. In some instances, the generative multimodal LLM may provide more detailed suggestions if training phrase examples and intent descriptions are included. The chatbot administrator may have an option to automatically apply the suggestions to the training data and retrain the chatbot. In some cases, the training data may be automatically updated and the chatbot automatically retrained without intervention or confirmation from the chatbot administrator. In this case, the chatbot administrator may review the updated training data, following the retraining of the chatbot.

Training data for chatbots may traditionally be based on user input phrases associated with an anticipated intent. As disclosed herein, chatbots may be trained based on crowdsourced data and/or labelled data (e.g., provided by a chatbot entity). Often, intents may not be defined in accordance with best practices (e.g., what is a bot: chatbots; what is a chatbot: chatbot). As another example, varying tagged or provided intents should be associated with a single intent (e.g., I'd like to go to beach: Beach Club; I would like to go to beach: Beach). As another example, different intents based on similar phrases but different subjects (e.g., different locations) may be provided (e.g., Can I buy your products in Barcelona?: Brand; Can I buy dress in Barcelona?: Product). Rather than generating a separate intent for each location, as shown above, a single intent may be generated and NER may be used to extract the location. Such a solution may allow generation of a new dataset or may repair an old dataset with reduced time spent and/or resources expended.

Figure 2C:
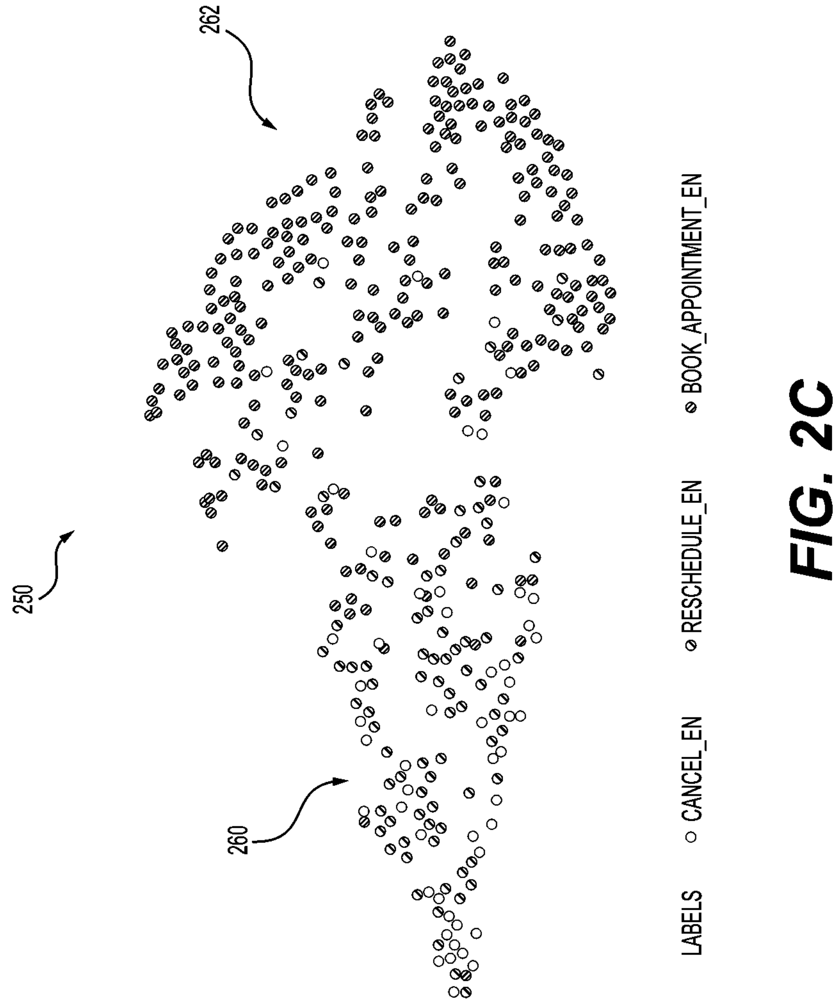
FIG. 2C is a plot depicting two intents visualized together, according to one or more embodiments.

As shown in plot 250 of FIG. 2C, intents that are identified as being similar to each other may be visualized together, instead of being visualized with all the other intents (e.g., as shown in FIGS. 2A and 2B). Cluster 260 may correspond to a first and a second intent and cluster 262 may correspond to a third distinct intent. Such isolated visualization may be provided to identify unintended possible overlaps. In some examples, a "cancel" phrase and a "reschedule" phrase may be associated with two different intents but may be confused by a classifier based on contextual similarity. Overlapping intents may be detected and flagged based on textual similarity, by semantic similarity, or by using a confusion matrix.

Text similarity between pairs of phrases may be computed for respective intents to maintain a maximum similarity per phrase. For example, the following two sentences may receive a Sorensen similarity score of 0.923: "I'm interested in purchasing a new Honda car, what are my options?" and "I'm interested in purchasing a new BMW car, what are my options?" Other similarity measures besides the Sorensen similar score may be used. Performance may be further improved with locally sensitive hashing or applying a sample of messages for comparison, instead of comparing all messages.

Semantic similarity may be computed using cosine similarity if sentences are embedded with deep neural network (DNN) algorithms such as Bidirectional Encoder Representations from Transformers (BERT), for example. If an intent is very similar to another intent according to averaged metrics it may be assumed that the intent overlaps.

A confusion matrix may be used to determine whether a trained classifier is unable to distinguish between intents (e.g., beyond a minimum threshold). The confusion matrix may be used to detect problematic intents. For example, a machine learning classifier may use brand names (e.g., Honda™ or BMW™) to differentiate between car brands. Test data may not capture when chatbot users omit the brand name when interacting with the chatbot, which may lead to identifying an incorrect intent.

Using the similarity and confusion matrix analysis, overlapping intents may be determined and a merge may be suggested (e.g., with custom named entities/keywords) to differentiate between user intents. Key words may be extracted from intent descriptions or utterances. According to an implementation, words most relevant to a communication or intent may be identified using BERT. For example, two training phrases may be similar but may relate to different intents. The most relevant keywords from each phrase that are not present in the other phrase may be identified. These keywords may be suggested as custom named entity/keywords that may be used to be more specific with a merged intent. Continuing the example provided above, a chatbot user may request information about a Honda or a BMW. The keywords (e.g., the only words that differ in the sentences) may be "Honda" and "BMW." The custom named entity/keyword may be that the brand is either Honda™ or BMW™. Frequent words in each similar intent may be found that are unique to each intent and they may be highlighted as potential named entities. Frequent words in each similar intent that are unique to each intent may be flagged as potential named entities. In some cases, an LLM may be used to identify named entities to use for a merged intent. If it is determined that two or more intents should be kept (e.g., by a chatbot administrator) an LLM may be used to generate new sentences related to each distinct intent, that are not similar. Approaches discussed herein may be combined to offer a chatbot administrator a solution to optimize chatbots based on intent differentiation or merging.

In some cases, two or more well-defined intents may have overlapping phrases associated with the two or more intents. The chatbot administration system may provide the overlapping phrases, together with all corresponding intents, as shown in the example table 220 of FIG. 2D. For example, at column 220*a* of table 220, a similarity score (e.g., a Sorensen similarity score) may be provided for measuring a similarity between a first sentence displayed in column 220*b* and a second sentence displayed in column 220*d*. Column 220*c* displays a first label that corresponds to the first sentence of column 220*b*. Column 220*e* displays a second label that corresponds to the second sentence of column 220*e*. The second label displayed in column 220*e* may be different than the first label displayed in column 220*c*. Additionally, the chatbot administration system may propose an action to associate all or some of the phrases with respective intents. The chatbot administration system may train the chatbot based on implementation of the action, such that other (e.g., future) overlapping phrases may be associated with other (e.g., new or existing) intents, based on the action.

Figure 3:
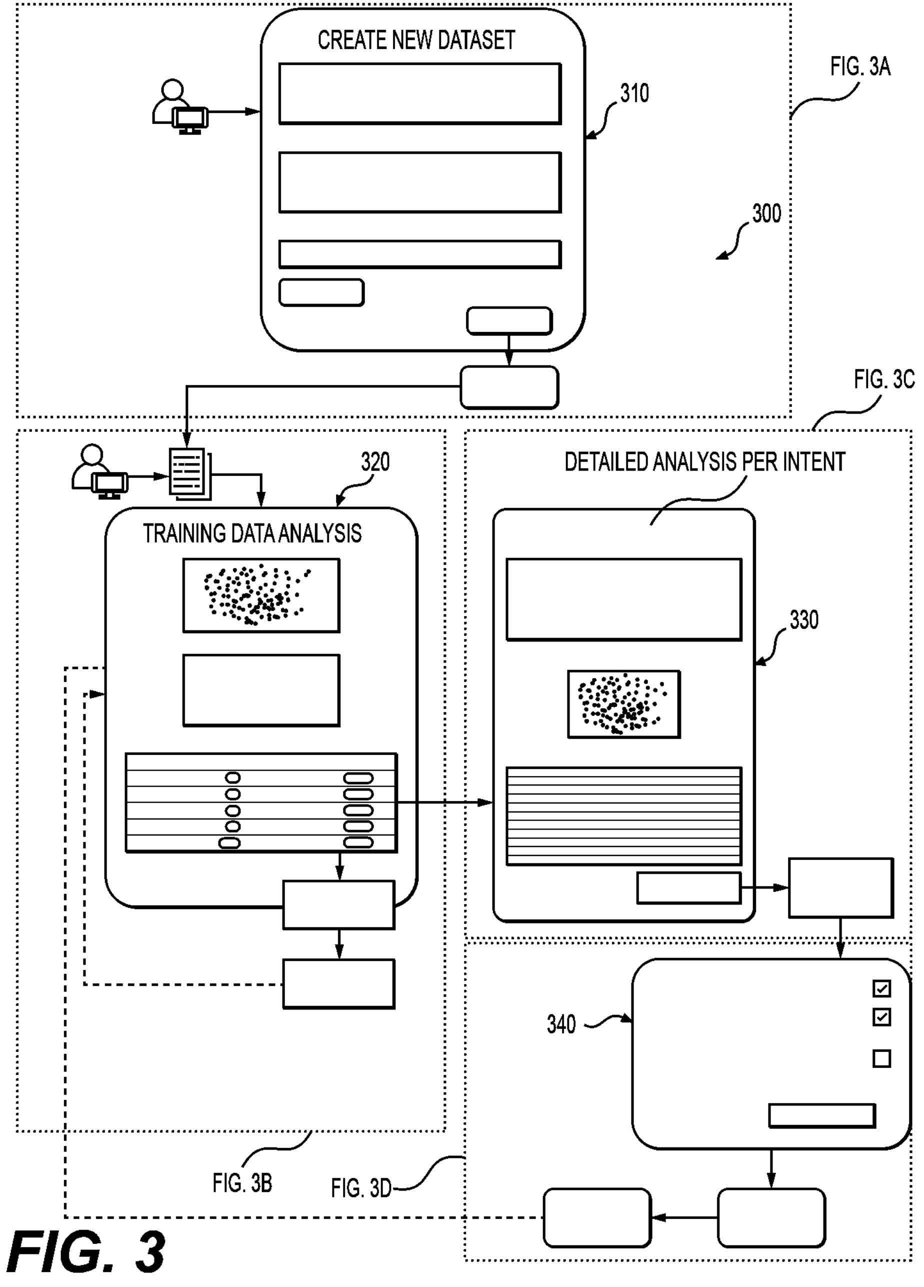
FIG. 3 is a flow diagram depicting a generalized flow for analyzing training data for a chatbot, in accordance with one or more embodiments.

FIG. 3 is a flow diagram 300 depicting a generalized flow for analyzing training data for a chatbot, in accordance with one or more embodiments. At 310, as shown in greater detail in FIG. 3A, a new training data set may be generated based on one or more intents. The training data may be automatically generated (e.g., using an AI model trained using crowdsourcing, based on historical phrases, based on example phrases) and may include training phrases associated with the one or more intents. Alternatively, or in addition, training data may be received based on actual user data, as shown in FIG. 3. For example, the training data may include one or more plots or data based on chatbot use such as graph 132 of FIG. 1I, plot 200 of FIG. 2A, plot 201 of FIG. 2B, plot 250 of FIG. 2C etc. At 320, as also shown in greater detail in FIG. 3B, data quality of a chatbot may be visualized in a 2D or 3D space. The visualizations may be based on analysis of training data that may include chatbot use data. For example, graph 132 of FIG. 1I, plot 200 of FIG. 2A, plot 201 of FIG. 2B, plot 250 of FIG. 2C etc. may be generated based on the analysis. Semantic overlaps between sentences may be identified using sentence transformers applied to training data or actual use data. False positive similarities may be introduced for intents, such as "goodbye" and "welcome." Language specific sentence transformers and/or a multilingual transformer (e.g., LabSE™) may be used to determine such similarities. According to an implementation, a bag-of-words model may be used to embed data into a t-SNE model, to identify lexically similar sentences.

Figure 3A:
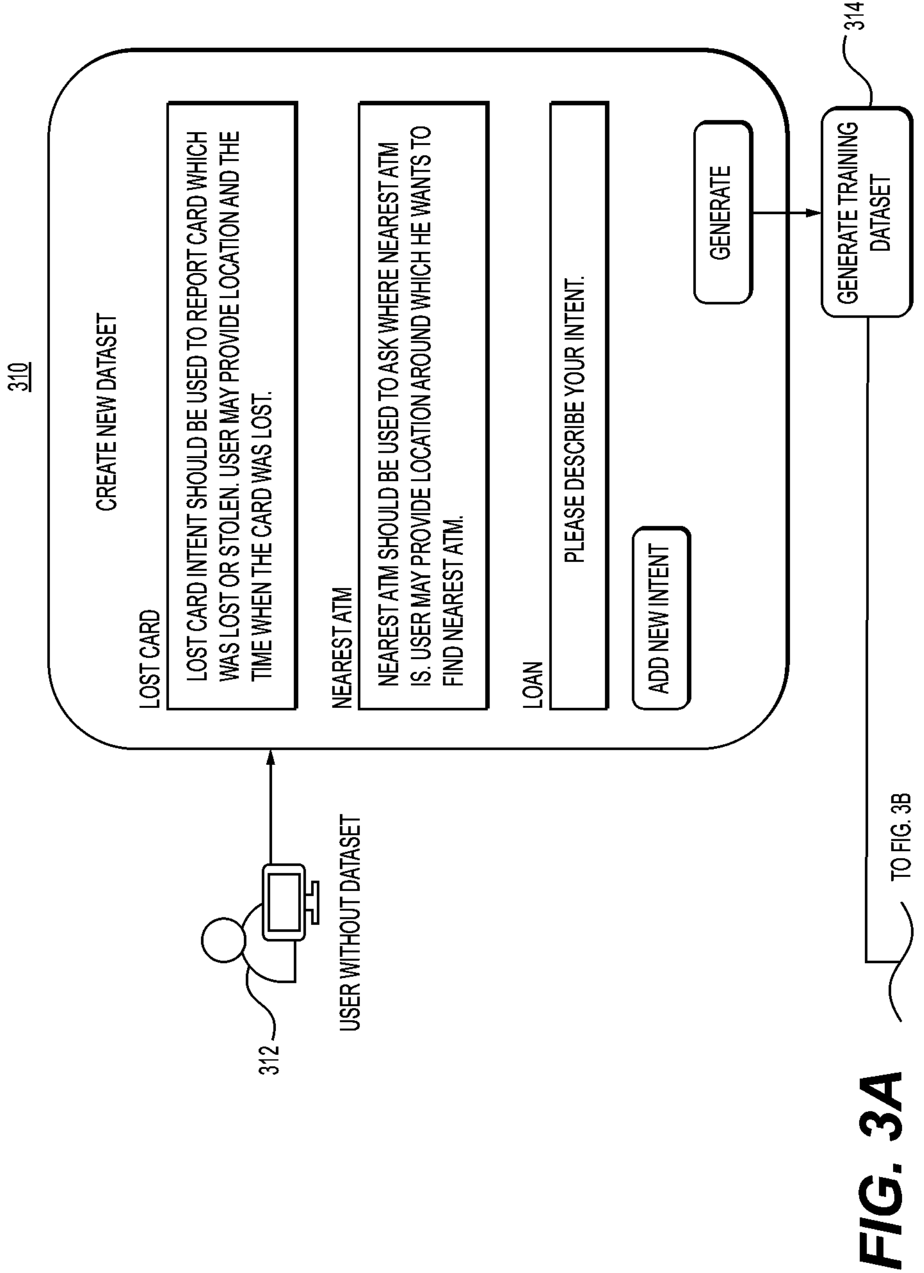
FIGS. 3A-3D are enlarged views of elements of the flow diagram depicted in FIG. 3.
Figure 3B:
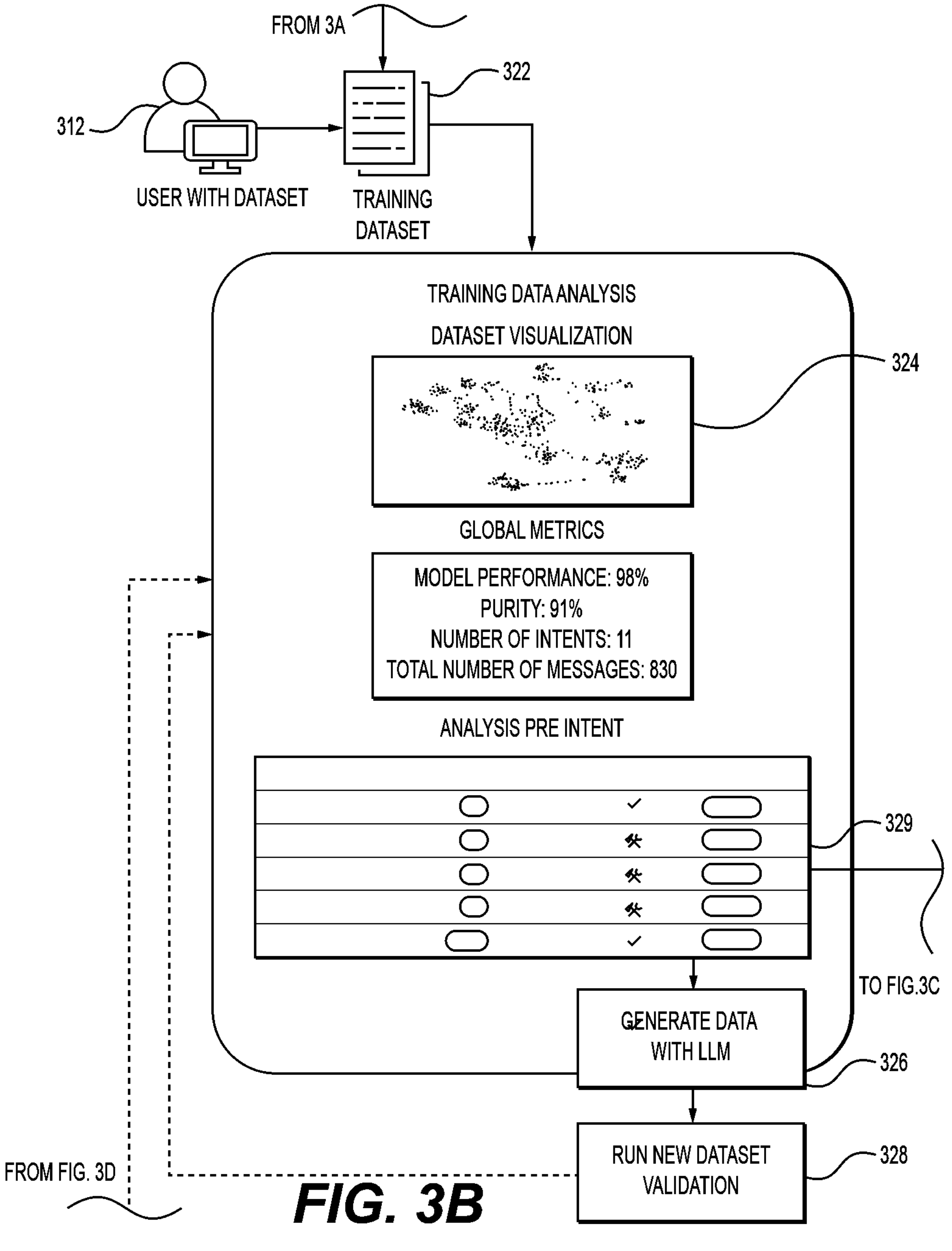

A visualization may display phrases and their respective intents, each in different colors and/or shades, as discussed in reference to FIGS. 2A and 2B, and also as shown at 320 in FIG. 3 and FIG. 3B. The visualization may depict similar phrases proximate to each other, regardless of intent. For example, Principle Component Analysis (PCA), Uniform Manifold Approximation and Projection (UMAP), t-SNE or the like may be used to generate the visualization. As a specific example, a t-SNE model may be used to estimate global dataset quality and find similar overlapping sentences having different intents. Such visualizations may be used to depict a subset of intents for a chatbot based on corresponding phrases.

An F1 score may be generated to estimate how a given model (e.g., chatbot) may generalize unseen data. An F1 score may be computed for each intent and may be an indicator of the training data quality. Computing a validation metric on small datasets with 10-20 training phrases per intent may be difficult to achieve. A test split may contain only 2-4 examples, which is too small of a size to get a robust estimate of performance. Accordingly, a generative LLM may be used to generate a test set of a larger size given an intent name/description and a sample of training data. An F1 score computed based on a generated test set may be more robust if the training dataset is small and/or with low variance. Purity of intents may be measured by averaging a purity of each intent, relative to the size of the intent. This metric may be an indicator of model generalization performance, together with the F1 score. Purity of intents may be a measure of overlap/similarity with other intents. For example, purity of intents may indicate whether a given intent is mixed with other intents. Purity generally drops with each overlapping intent and relative to their similarity score. A low purity (e.g., a high impurity) may be an indicator of potential deficiency of the machine learning model performance, even if a corresponding F1 score is high based on training or test data. One way to measure purity is to calculate cosines similarity between all intents and determine a threshold above which it may be determined that two intents are too similar. For example, the similarity threshold for the example list of intents below may be 50%:

YES:GOODBYE, cos_score:59%
CHATBOTS:CHATBOT, cos_score:51%
CHATBOTS:CHAT APPS, cos_score:56%
GOODBYE:CHATBOT, cos_score:54%
GOODBYE:AGENT, cos_score:61%
GOODBYE:INSULTS, cos_score:68%
CUSTOMER STORIES:CHAT APPS, cos_score:51%
CUSTOMER STORIES:SOLUTIONS, cos_score:60%
CHATBOT:AGENT, cos_score:67%
CHATBOT:INSULTS, cos_score:59%
COUNTRY:ORIGIN, cos_score:70%
AGENT:INSULTS, cos_score:52%
AGENT:VOICE, cos_score:51%
AGENT:CONVERSATIONS, cos_score:55%
CHAT APPS:CONVERSATIONS, cos_score:63%
CHAT APPS:SMS, cos_score:53%
CHAT APPS:WHATSAPP, cos_score:54%
VOICE:CONVERSATIONS, cos_score:53%

For each intent, a list of similarity scores with other intents may be extracted, if the similarity scores are above the similarity threshold (e.g., 50% in this example), as shown below:

AGENT: [0.61, 0.67, 0.52, 0.51, 0.55]
CHAT APPS: [0.56, 0.51, 0.63, 0.53, 0.54]
CHATBOT: [0.51, 0.54, 0.67, 0.59]
CHATBOTS: [0.51, 0.56]
CONVERSATIONS: [0.55, 0.63, 0.53]
COUNTRY: [0.70]
CUSTOMER STORIES: [0.51, 0.60]
GOODBYE: [0.59, 0.54, 0.61, 0.68]
INSULTS: [0.68, 0.59, 0.52]
ORIGIN: [0.70]
SMS: [0.53]
SOLUTIONS: [0.60]
VOICE: [0.51, 0.53]
WHATSAPP: [0.54]
YES: [0.59]

For each intent, a list of similarity scores may be extracted with other intents if the similarity scores are above the threshold. For each intent, all overlapped intents may be considered in sorted order, as shown by the following equations 1A through 1D:

$$y = 0.9 \quad \text{(Equation 1A)}$$

$$res += \frac{\text{similarity}}{\text{intents\_count}^{Y}} y *= y \quad \text{(Equation 1B)}$$

-continued $$res += \frac{\text{similarity}}{\text{intents\_count}^{Y}} y *= y \quad \text{(Equation 1C)}$$

$$\text{purity} = 1 - res \quad \text{(Equation 1D)}$$

One example of determining purity for the example intent "CHATBOTS" with similar intents score of 0.56 and 0.51 is shown in the following equations 2A and 2B $$\text{purity} = 1 - \left(\frac{0.56}{26^{0.6}} + \frac{0.51}{26^{0.81}}\right) \quad \text{(Equation 2A)}$$

$$\text{purity} = 0.93 \quad \text{(Equation 2B)}$$

The list below shows a calculation for all intents in accordance with the example above:

YES: 96.85677117539025%
CHATBOTS: 93.28297515870848%
EMAIL: 100%
ABM: 100%
FOUNDERS: 100%
GBM: 100%
GOODBYE: 68.98827874511902%
CUSTOMER STORIES: 92.99726112047469%
CHATBOT: 69.98709315982518%
COUNTRY: 96.27074546232743%
FUN FACTS: 100%
ORIGIN: 96.27074546232743%
AGENT: 35.44415161324164%
JOB: 100%
MOBILE IDENTITY: 100%
CHAT APPS: 38.90762734698517%
SOLUTIONS: 96.80349611056637%
PRICING: 100%
ABOUT INFOBIP: 100%
INSULTS: 84.9959587462379%
VOICE: 93.49726068738381%
MOMENTS/FLOW: 100%
OFFICES: 100%
CONVERSATIONS: 85.81806358868981%
SMS: 97.17642156433362%
WHATSAPP: 97.12314649950973%
GLOBAL: 90.16999986312001%

Further, some intents may be weighted less than each highly similar intent. For example, values for Y may include {0.2, 0.3, 0.4, 0.5} where an equation 3 for purity with a discount factor is as follows:

$$\text{purity} = \frac{1}{(1+Y)^{similar\_intents}} \quad \text{(Equation 3)}$$

In this example, Y=0.4, and the intent in question overlaps with three other intents. Therefore, the purity is calculated as follows in equation 4:

$$\text{purity: } \frac{1}{(1+0.4)^{3}} = 0.36 \quad \text{(Equation 4)}$$

Some intents may have significantly less (e.g., three standard deviations from a mean value) training utterances than other intents which may affect their performance. This may be acceptable for some less relevant intents such as “goodbye” or “welcome.” However, for more relevant intents, a warning may be generated indicating training utterances below a training utterance threshold. According to an implementation, based on such a warning, training data up to the training utterance threshold (e.g., average size) of intents may be automatically generated. Such training data may be generated using an LLM/generative model, as discussed herein, to augment existing training data associated with respective intents. For such respective intents, a user interface (UI) option may be offered to generate additional phrases until a size of the training phrases associated with such intents meets the training utterance threshold. Further, the number of training phrases associated with an intent may be statistically higher than for other intents. As a result, the model may “favor” such an intent with a statistically higher number of training phrases. Such intents, with statistically higher number of training of phrases, may be down sampled while maintaining maximal intent variance.

Datasets for chatbot training may be developed iteratively, as shown at 310 of FIG. 3 and FIG. 3A. For example, an LLM may be used to quickly generate higher quality training data with low costs and/or resource use. The chatbot administrator 312 may provide a general description of an intent and basic language for generated phrases. A chatbot administrator 312 may further provide an intent description and desired languages and may, in some cases provide training examples. At 314, a generative model (e.g., an LLM) may be used to generate training dataset 322. According to an implementation, the chatbot administrator 312 may add additional intents. The generative model may generate training phrases, training conversations, terms, and/or the like based on the intents. According to an implementation, the intents may be identified based on the analysis further described in relation to step 320 at 330. For example, flow diagram 300 may be a loop and the techniques disclosed herein may be used to train and/or re-train a chatbot based on chatbot analysis, updated/corrected intents, updated/corrected training data, etc. Accordingly, at 314, the generative model may generate new or additional training data based on new, existing, and/or corrected intents.

At 320, training data analysis may be computed and data may be visualized based on intent analysis, as shown at 324. The system may automatically propose solutions for intents that may be very similar. Alternatively, at 326, a new set of training utterances may be generated that may be less similar between intents. A chatbot administrator 312 or automated system (e.g., machine learning model) may continue to add intents, such that, at 328, an intent analysis and validation is conducted for each added intent and so the chatbot administrator 312 is provided feedback if the added intent performs well and/or overlaps with other intents. Further, a chatbot administrator 312 may import existing data at one given time. Analysis may be completed, and solutions may be suggested as if the intent was generated or imported one at a time.

Figure 3C:
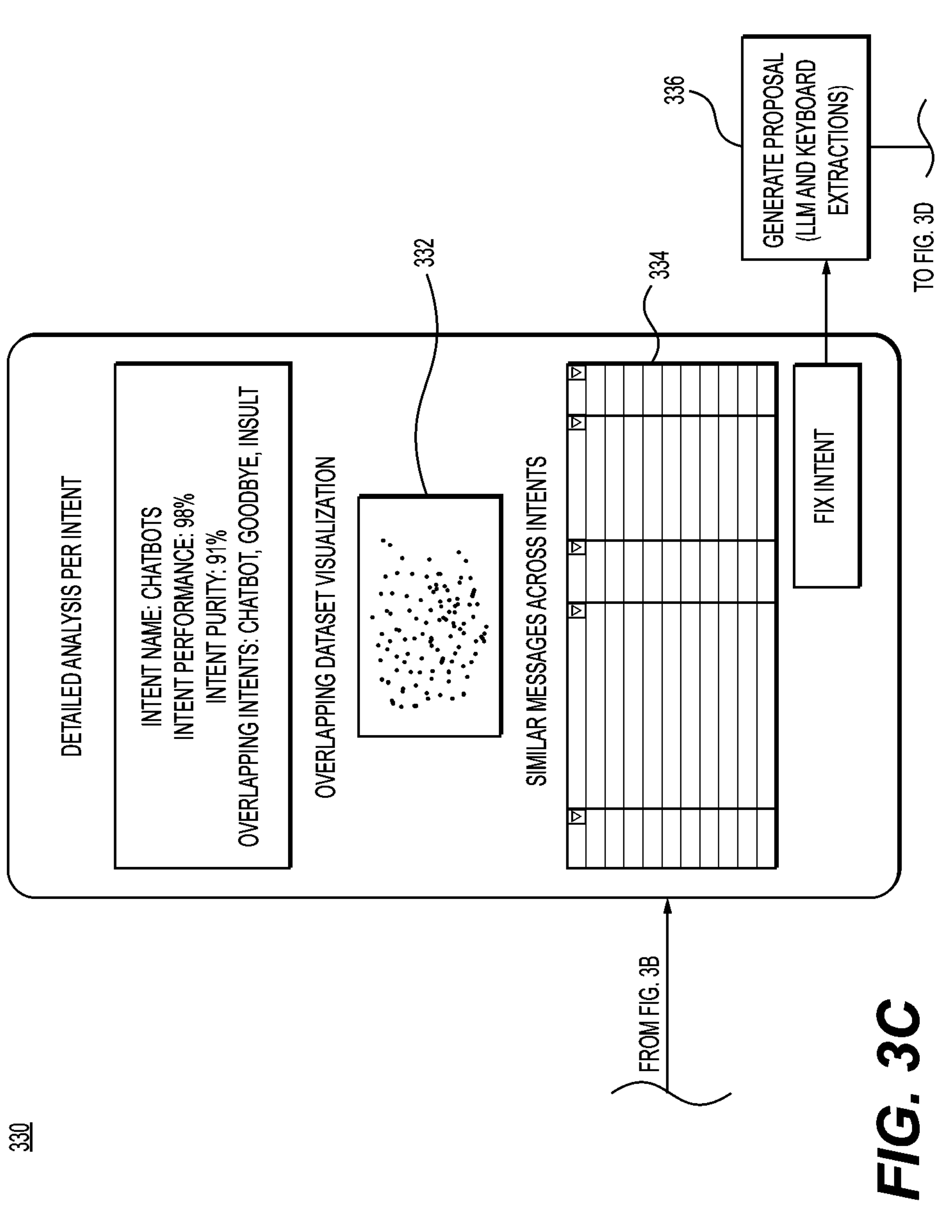

As shown at 320 in FIG. 3 and FIG. 3B, at 329, an overview of analysis per intent may be provided. Additionally, at 330, as shown in FIG. 3 and FIG. 3C, a detailed analysis per intent may be provided. Detailed analysis per intent may be for a specific intent shown in the overview of analysis per intent shown at 320. The detailed analysis may include overlapping dataset visualizations 332 for the given intent and may also show similar messages across intents 334 for chatbot administrator 312 or automated review and/or modification. A determination to correct a given intent may be received (e.g., via selection of a UI input, such as a button). At 336, one or more sentences or intent adjustments may be generated (e.g., using an LLM and/or keyword extraction).

Figure 3D:
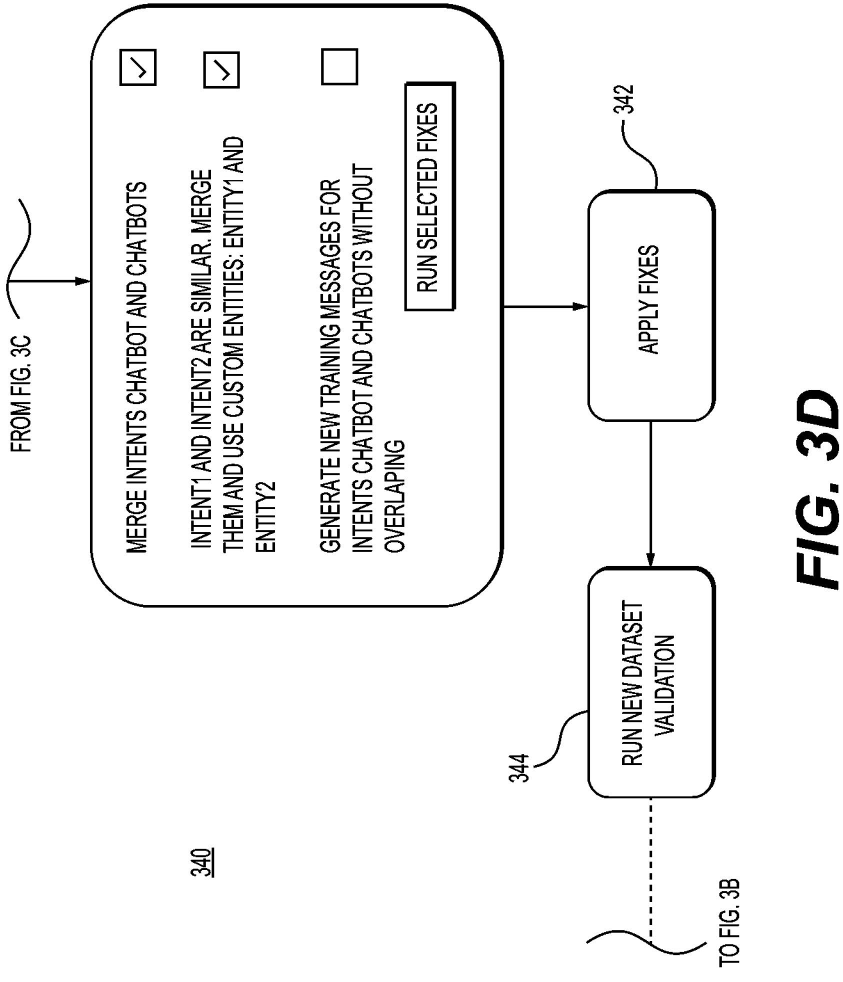

As shown at 340 in FIG. 3 and FIG. 3D, one or more corrective actions may be provided. The corrective actions may include, for example, merging an intent, merging intents across different chatbots, generating new training messages for intents without overlap, etc. At 342, elected actions may be applied and at 344, one or more steps (e.g., step 310, 320, 330, and/or 340) may be iteratively re-applied based on new data sets.

Figure 4A:
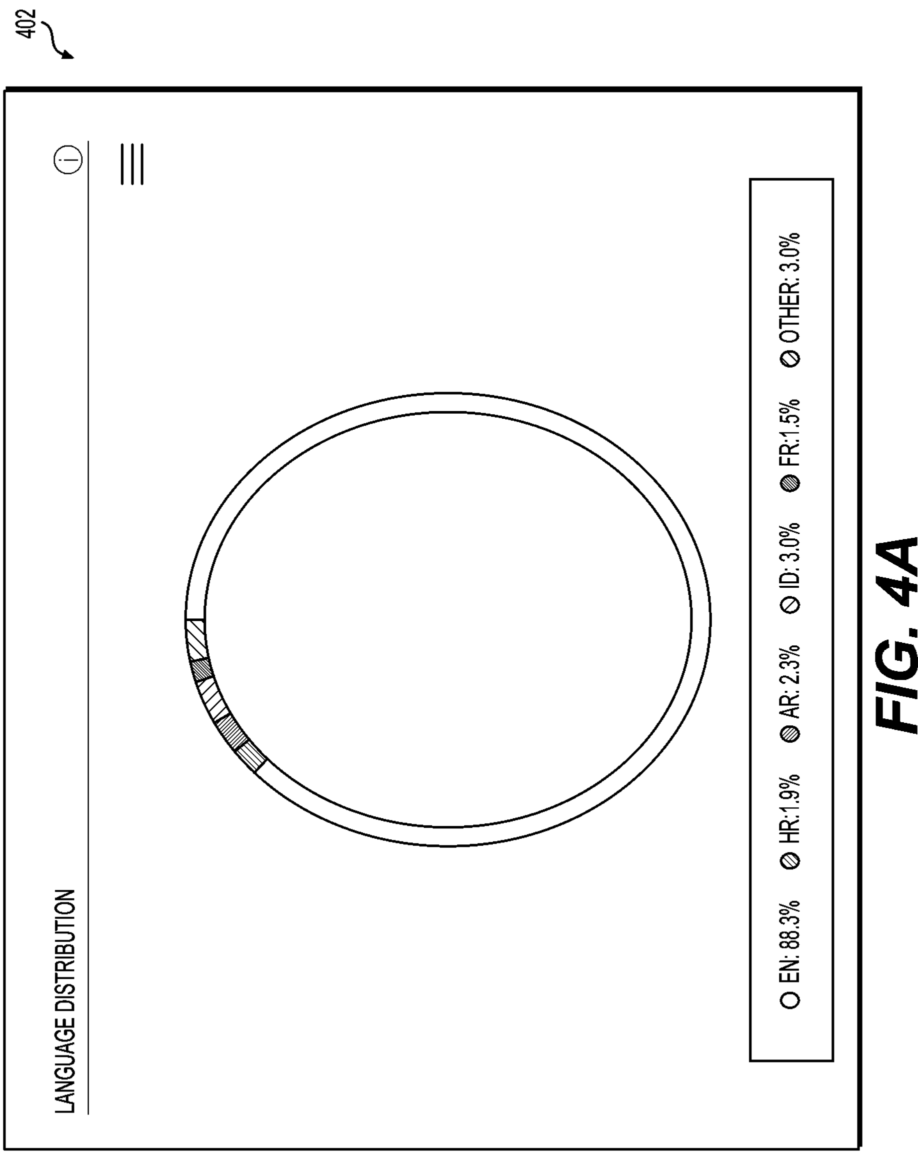
FIGS. 4A and 4B are graphics that represent various chatbot analysis indications, in accordance with one or more embodiments.
Figure 4A:
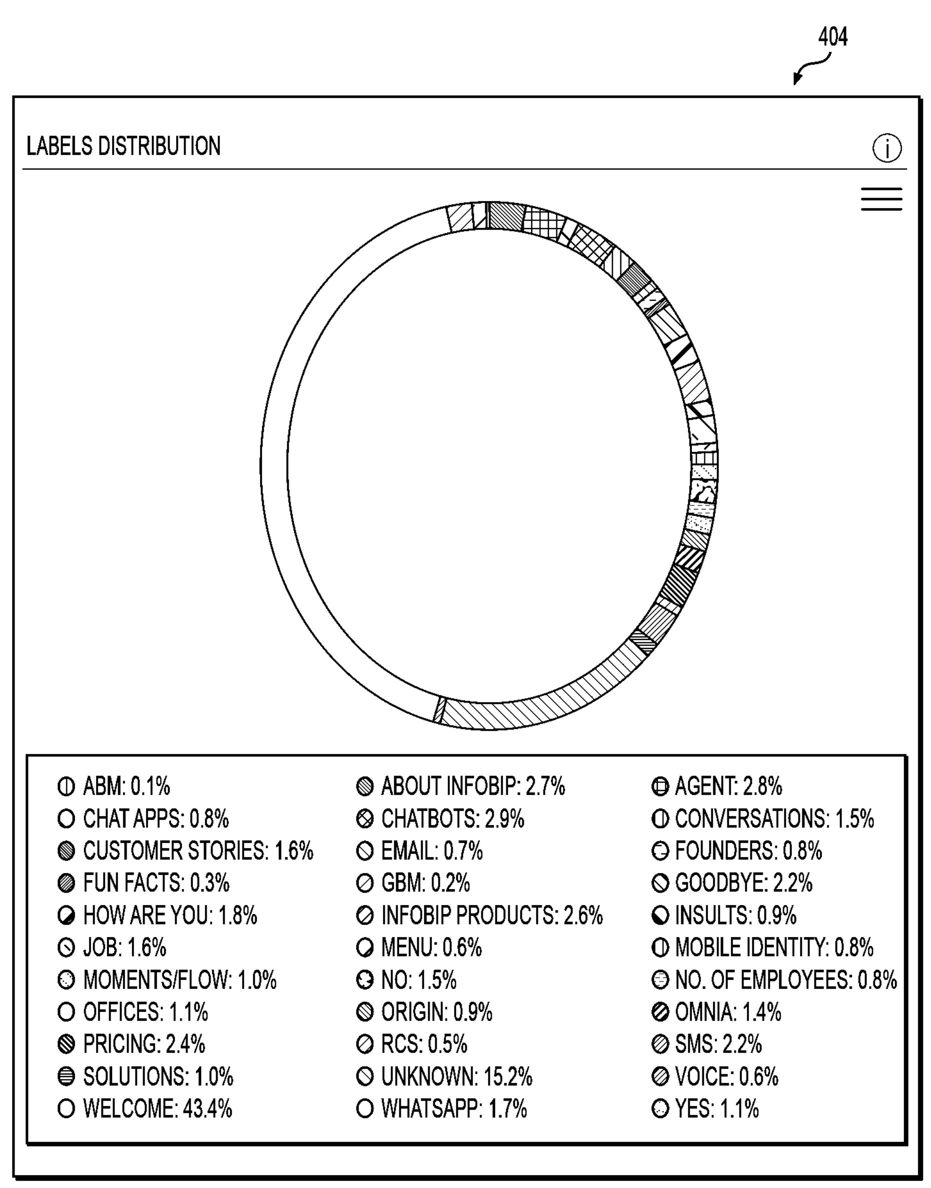
Figure 4B:
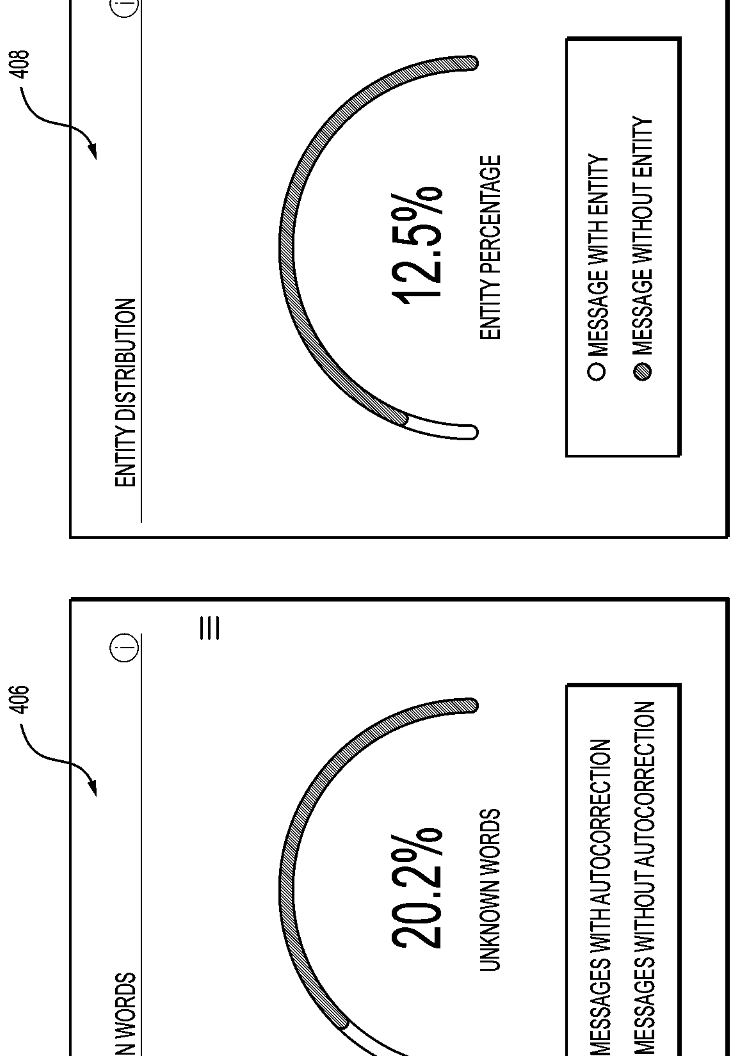

FIGS. 4A and 4B are graphics that represent various chatbot analysis indications, in accordance with one or more embodiments. Such chatbot analysis indications may be generated based on chatbot use to determine chatbot characteristics and/or whether a given chatbot requires retraining or adjustment. For example, the chatbot analysis indications may include a language distribution 402, an intent distribution 404, an autocorrect usage (not shown), an indication of long messages (not shown), an indication of unknown words 406, and/or an entity distribution 408. Techniques disclosed herein may be used to determine, for example, independent from the languages the chatbot was originally built using, which languages are most often spoken by end users; the most frequent queries from end users; if the chatbot is trained to meet a threshold (e.g., for a ratio of messages with at least one auto-corrected word; entity distribution across intents (e.g., whether the chatbot using NER attributes to their full potential or whether end users need to repeat themselves multiple times); and/if there are any messages that are not primarily designed to be handled by a chatbot and should be investigated separately (e.g., long messages).

Language distribution may refer to the number and percentage of languages that were detected by the chatbot during chat sessions. An example language distribution 402 for an example chatbot is depicted in FIG. 4A with an example graphic showing 88.3% of chatbot users interacted with the chatbot in English, while 11.7% of users interacted in a language other than English. This may be determined independent of the languages with which the chatbot was originally created. Language distribution for a given chatbot may be provided to a machine learning model and the model may determine that a given chatbot should be re-trained based on one or more additional languages, based on the language distribution. As described in reference to flow diagram 300 of FIG. 3, one or more intents may manually or automatically (e.g., using an LLM) generate training data to re-train the chatbot based on language distribution analysis.

Intent distribution may refer to determining and displaying the most frequent queries from chatbot users, and the resulting determined intents. Intent distribution may also be referenced as “labels distribution” as shown in example intent distribution 404 of FIG. 4A. Autocorrect usage (not shown) may refer to the ratio of chat sessions and/or messages that include at least one auto-corrected word in the user’s message. Intent distribution and/or autocorrect usage for a given chatbot may be provided to a machine learning model and the model may determine that a given chatbot should be re-trained based on one the intent distribution and/or autocorrect usage. As described in reference to flow diagram 300 of FIG. 3, one or more intents may manually or automatically (e.g., using an LLM model) generate training data to re-train the chatbot based on the intent distribution and/or autocorrect usage.

An indication of long messages (not shown) may show a percentage of messages classified as long messages, and may include a list of messages that are longer than a typical message that is exchanged with the analyzed chatbot. There may be a threshold length of a message, where a message is flagged as being a "long message" if it is longer than the threshold length. In some cases, the threshold length corresponds to any length within three standard deviations of an average message length. If a message is flagged as being a long message, the chatbot administrator may investigate whether this is the kind of message that the chatbot should be trained to respond to properly, or whether it is an inconsequential anomaly associated with the chatbot. Entity distribution may refer to determining whether the chatbot is using NER attributes as intended, as shown in 408 of FIG. 4B. An entity distribution having an unfavorable ratio may indicate that chatbot users need to repeat themselves a threshold number of times during a chat session, which may be undesirable. A percentage of words unknown to the chatbot may be generated and displayed, as shown in 406 of FIG. 4B. Unknown words may refer to words entered a chatbot user in a chat session that the chatbot has not been trained to recognize. A chatbot administrator or automated system may use the chatbot analysis indications to determine how the chatbot may be improved and may cause the chatbot to be retrained based on the chatbot analysis indications (e.g., as described in reference to flow diagram 300 of FIG. 3). The chatbot analysis indications may be examples of the patterns identified in received conversations.

Following deployment of a machine learning system, such as an intent-based chatbot system, performance of a machine learning model may degrade due to "machine learning drift." In some cases, it may be possible to inspect all inference data to determine which labels (e.g., intents) are missing and which existing labels should be reinforced with new data. However, some chatbots receive millions of messages on a regular basis and it may be useful to automatically select a relevant subset of inference data to inspect. In some cases, without automatic analysis and visualization of training data and conversation data, chatbots and similar text classification systems may never be retrained with updates and fixes. This may lead to poor user experience with chatbots that do not adapt to changes in their environments. Additionally, initial data may be created by a single person and may not be representative of end user interests.

Traditionally, chatbot administrators may not have expertise to analyze chatbot data or do not have access to chatbot data for analysis. Chatbot administrators may therefore guess how chatbot users want to use chatbots, but these guesses may not be accurate. Furthermore, chatbot administrators may attempt to build a chatbot with only a few phrases associated with each intent, which may lead to poor chatbot performance, since a chatbot trained with a large number of phrases associated with each intent will perform better. Moreover, once the chatbot is deployed, the guesses associated with chatbot intents may never subsequently verified and corrected when such a correction is needed.

Another issue with machine learning drift is that the environment in which a chatbot operates may change over time. For example, a chatbot may be trained before an event, such as the COVID-19 pandemic, and may not be trained to handle requests and conversations dealing with the event. A chatbot that was trained before the COVID-19 pandemic will not be capable of answering queries regarding the pandemic or any related topics such as COVID-19 testing and vaccines. New topics discussed in chat sessions inevitably arise, which, if not consistently and repeatedly analyzed and retrained, a chatbot will not be capable of handling queries related to the new topics. This example is further discussed herein in reference to FIG. 8A.

According to implementations disclosed herein, active learning may be used to minimize the amount of data that required for chatbot training and may further be used to maximize the benefit from each trained data point. As used herein, a "concept" may refer to a pair of mutually dependent words that may together represent an intent of a user message. One or more concepts may be mined using an unsupervised algorithm that detects potential ideas that end users may discuss. A concept may represent new intents to be added to a chatbot and/or may include training phrases that may be used to improve the accuracy of a chatbot (e.g., an AI chatbot, as discussed herein). As used herein, an "unknown label" may be associated with messages that include words (e.g., most words) not included in training data. Such messages may be flagged for review to, for example, determine if one or more such messages should not be linked with existing intents and may be used as new training phrases. As used herein, an "uncertain decision" may correspond to instances where a chatbot is not confident about a given message's intent. Such corresponding message may be used to train (e.g., retrain) a chatbot for improved performance.

Figure 5:
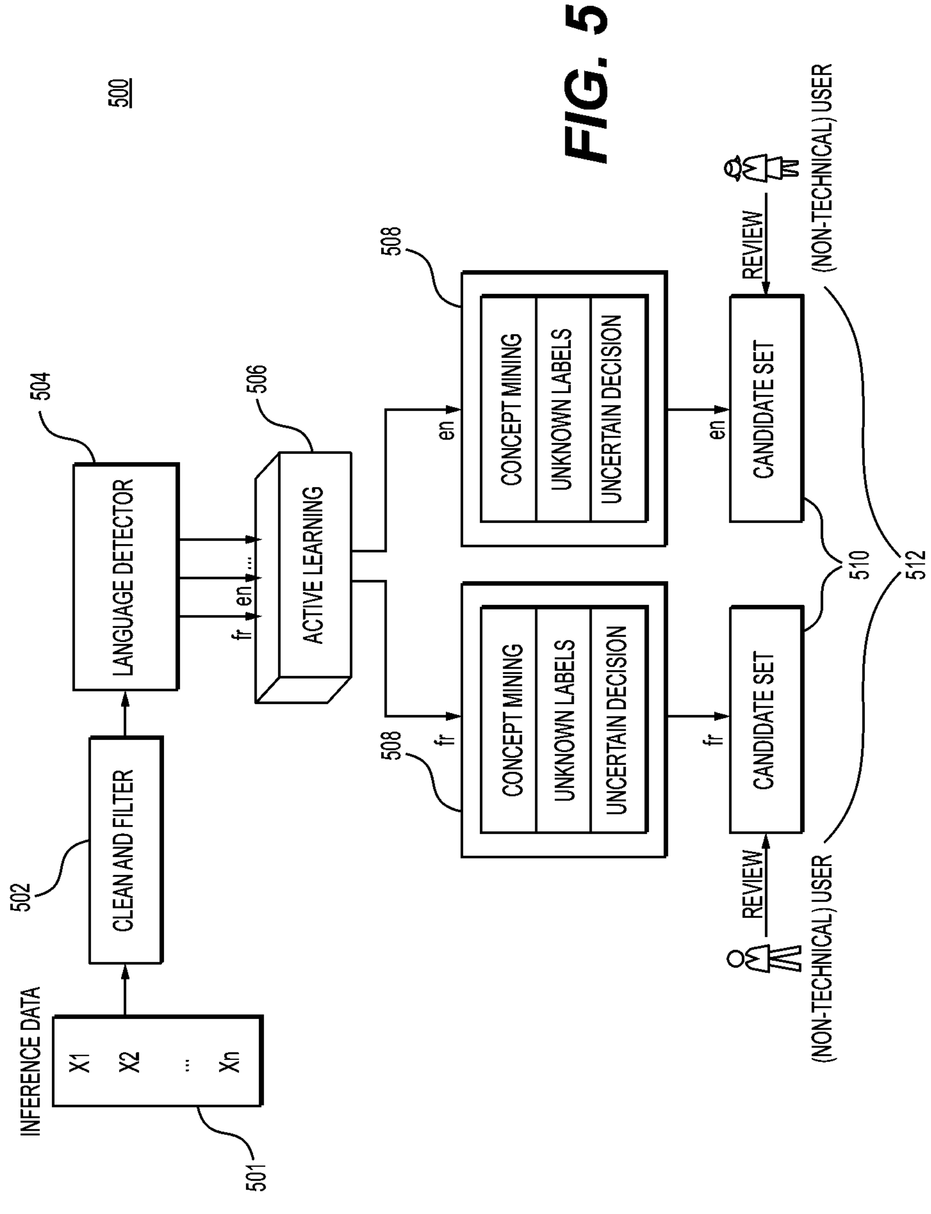
FIG. 5 is a flow diagram depicting an overview of an active learning chatbot improvement system, in accordance with one or more embodiments.

FIG. 5 is a flow diagram 500 depicting an overview of an active learning chatbot improvement system, in accordance with one or more embodiments. The active learning chatbot improvement system of FIG. 5 may be used to label phrases for intent generation (e.g., after an initial chatbot training). At 502, inference data 501 may be cleaned and/or filtered prior to being provided to a language detector 504 for active learning at 506. For example, during the filtering and/or cleanup 502, text may be harmonized (e.g., lowercased) and numbers and most special characters may be removed. Very short messages meeting a message threshold (e.g., including only one word) only may be ignored. Very short messages are typically routed to a default dialog in a chatbot unless they match a predefined keyword and may generally not be used as labelling candidates.

At language detector 504, data may be grouped by language by using a highly customizable language detector. During active learning 506, following language detection, active learning methods may be executed, in accordance with one or more embodiments disclosed herein. At 508, active learning methods may be executed for each detected language (e.g., English, French, etc.), such as concept mining, unknown labels detection, uncertain decisions, and/or the like or combination thereof. At 510, a candidate set for labelling may be generated corresponding to each detected language and based on these active learning methods. At 512, a chatbot administrator or automated system (e.g., machine learning model) may review the generated candidate sets.

Deep learning techniques may be used to categorize data into shared embedding spaces for multiple languages. However, performance may be improved and hardware costs may be reduced by building a simpler classification model per language. Chatbots used as or for software as a service (Saas) applications may be built to support one to two languages. Replies and dialog actions may be localized (e.g., based on language) in addition to or instead of simple intent classification.

Figure 6:
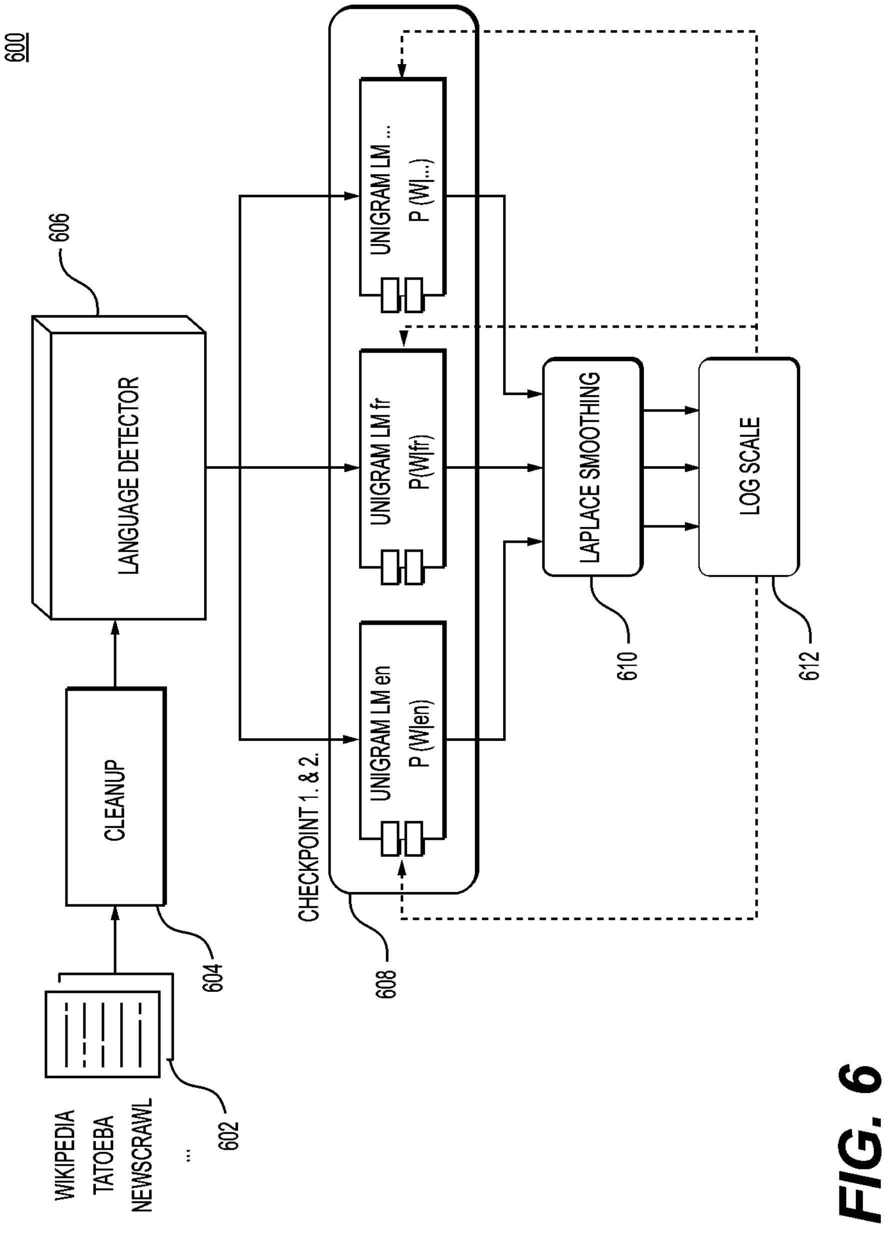
FIG. 6 is a flow diagram depicting language detection, according to one or more embodiments.

FIG. 6 is a flow diagram 600 depicting language detection, according to one or more embodiments. Language detectors may traditionally use character n-grams which may be used for short sentences (e.g., meeting a short sentence threshold). However, such use of n-grams may add complication. For example, two languages which might not share many common words such as English and French might share many of the character n-grams which makes language detection more difficult. In some example chatbots, chatbot users' language distribution consists of languages which share relatively few words between themselves, e.g., Arabic, Indonesian, Spanish, French combined with English. Therefore, a customizable set of languages with word-unigrams may be used, rather than character n-grams. Use of such word-unigrams may improve language detection performance on benchmarks and actual production settings.

As shown at 602 in FIG. 6, data may be received from a database such as an entity's database, an open-source repository (e.g., Wikipedia™, Tatoeba™, Newscrawl™), etc. At 604, such data may be cleaned and the cleaned data may be provided to a language detector component 606, as discussed herein in reference to FIG. 5. Multinomial Naive Bayes is a generative model for which word probability distribution may be computed independently for each language. These pre-computed probability distributions may be saved as shown at 608 (e.g., at a first checkpoint). As shown, probability distributions (P(W)) may be stored for each applicable language. According to an implementation, for each language, a separate symbol table may be created with any applicable number (e.g., approximately 6,000) of most frequent words and may include their (log scaled) probabilities. At 610, Laplace smoothing may be applied across all loaded languages. At 612, log scaling may be applied to the data which may be saved as a set of pre-trained models, as depicted at 608 in FIG. 6 (e.g., at a second checkpoint).

Figure 7:
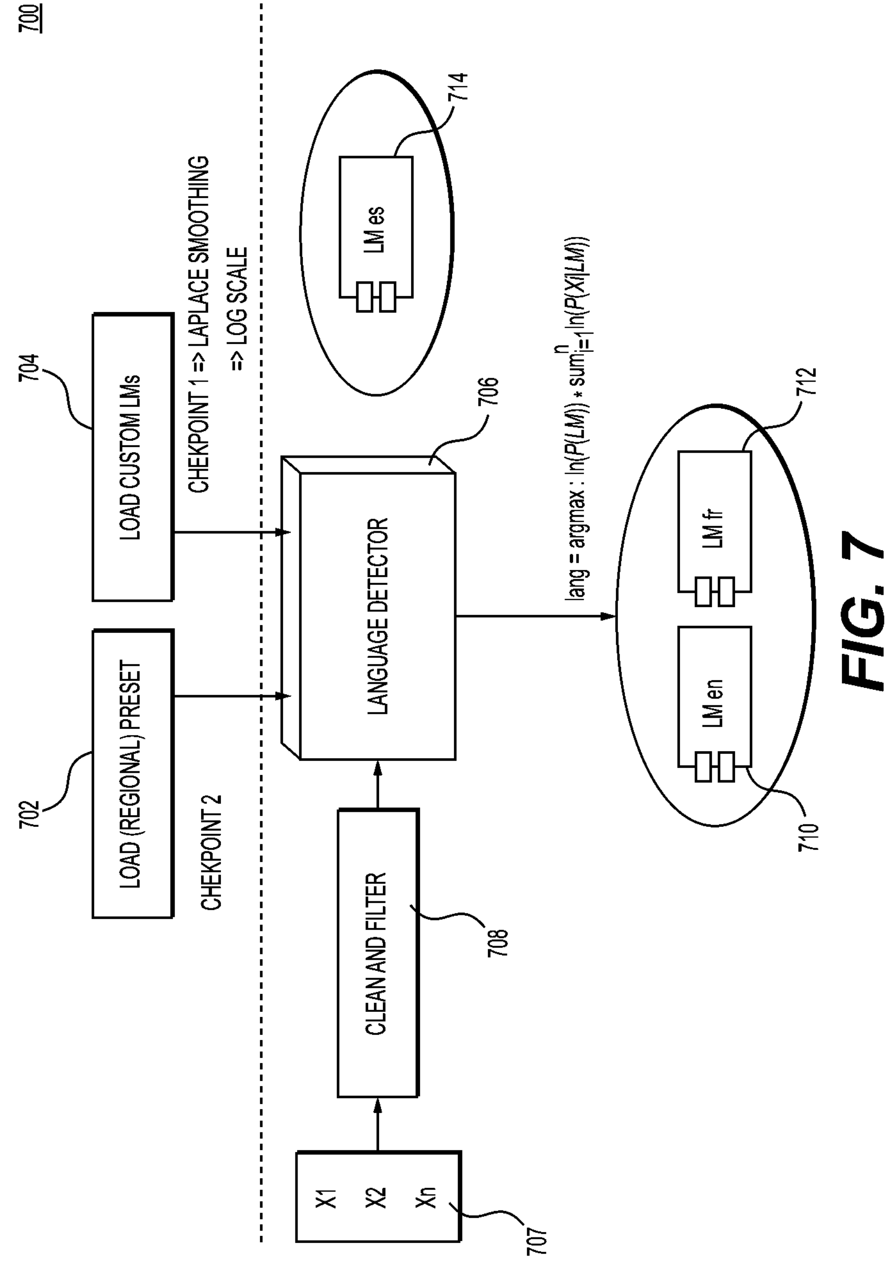
FIG. 7 is a flow diagram depicting an inference of language detection, in accordance with one or more embodiments.

FIG. 7 is a flow diagram 700 depicting an inference of language detection, in accordance with one or more embodiments. At 702, based on client region, a pre-trained set of languages may be loaded at a language detector 706. Alternatively, or in addition, at 704, a custom set of languages may also be selected and/or loaded at language detector 706. Inference data 707 may be cleaned and filtered at 708, and provided to language detector 706. Language models, such as English language model 710 and French language model 712 may be output by language detector 706. In some embodiments, English language model 710 and French Language model 712 may be supplemented with the pre-trained set of languages loaded at 702 and/or the custom set of languages loaded at 704. Other language models, such as Spanish language model 714 may not be supplemented by the language detector 706 or the pre-trained set of languages loaded at 702 or the custom set of languages loaded at 704. As discussed above, word probability distribution for each language may be independent for each respective language. A uniform prior probability may be used for each language, although a chatbot administrator may modify prior probabilities to reflect a target region where particular languages are spoken. A prior probability may be a probability without considering evidence. For example, if it is known that 70% of potential chatbot users in a target region speak English and 30% speak Spanish, a prior probability for message language may be set for English at 70%, without considering any text of the message itself. A uniform prior probability for languages may indicate that all languages are expected to be equally probable (e.g., important) such that decisions may be bade based on message words (e.g., only based on message words). Sparse vector representation may be used for inference texts as likelihood of observed words may be computed for each language by a simple symbol table lookup. This implementation may yield throughput in tens of thousands requirements/second, based on an underlying device being used (e.g., desktop computers, laptops, etc.).

The chatbots, as disclosed herein, may be dialog-action based and deployed on channels such as WhatsApp™, Facebook Messenger™, etc. Most chatbot user messages may include, for example, 1-2 sentences. Topic mining may generate word probability distribution for each of a number of K topics. However, as training "documents" (e.g., phrases) may be short, concepts and topics may be built starting from two words. As used herein, "concept" may be used interchangeably with syntagmatic relation and may define a word-pair with mutual dependence, for example.

As an example, if the word "fish" appeared a sentence, the word "swim" may be less uncertain (e.g., more probable) to appear as a result of the word "fish." Similarly, if the word "fish" does not appear, the certainty of the word "swim" may be affected. This uncertainty reduction may be measured with mutual information as defined in equations 5A-5C below:

$$I(X;Y)=H(X)-H(X\mid Y)=H(Y)-H(Y\mid X) \quad \text{(Equation 5A)}$$

$$H(X_W)=\sum_{v\{0,1\}}-P(X_w=v)*\log_2 P(X_w=v) \quad \text{(Equation 5B)}$$

$$H(X_{w1}\mid X_{w2})=\sum_{u\{0,1\}}(P(X_{w2}=u)*H(X_{w1}\mid X_{w2}=u) \quad \text{(Equation 5C)}$$

For equations 1A-10C herein, X and Y are binary random variables. $X_w$ models presence or absence of word w. H(X) and H(Y) represent entropy of X and Y, respectively. H(X|Y) represents conditional entropy of X given Y. H(Y|X) represents conditional entropy of Y given X. I(X;Y) represent mutual information of X and Y. $P(X_w=1)$ is the probability of word W1 being present. $P(X_w=0)$ is the probability of word W1 being absent. $P(X_w=1, X_w=1)$ is the probability of both words appearing in a text segment. Mutual information may also be expressed with Kullback-Leibler (KL) divergence, as shown in equation 6:

$$I(X_{w1};X_{w2})=\sum_{u\in\{0,1\}}\sum_{v\in\{0,1\}}p(X_{w1}=u,X_{w2}=v)\log_2\frac{p(X_{w1}=u,X_{w2}=v)}{p(X_{w1}=u)p(X_{w2}=v)} \quad \text{(Equation 6)}$$

With KL divergence, a difference between actual joint probability distributions for word pairs against probability distribution with independence assumption may be measured. KL divergence may capture non-linear relationship between word pairs. For example, in accordance with equation 7 below, four possible combinations may exist where words W1 and W2 may be present or absent:

$$p(X_{w_1}=1,X_{w_2}=1)+p(X_{w_1}=1,X_{w_2}=0)+p(X_{w_1}=0,X_{w_2}=1)+p(X_{w_1}=0,X_{w_2}=0)=1 \quad \text{(Equation 7)}$$

Individual probabilities may be computed as, for example in equations 8A-8C:

$$p(X_{w1}=1)=\frac{\text{count}(w1)}{N} \quad \text{(Equation 8A)}$$

-continued $$p(X_{w2}=1)=\frac{\text{count}(w2)}{N} \quad \text{(Equation 8B)}$$

$$p(X_{w1}=1, X_{w2}=1)=\frac{\text{count}(w1, w2)}{N} \quad \text{(Equation 8C)}$$

Where N is the number of inference messages.

Smoothing may be applied to give small probability $P(W_{unk})>0$ to unseen words, shifting some probability mass from words with larger probabilities. This may be useful in combination with whitelisting or any other scenario which may introduce unseen words.

$$p(X_{w1}=1)=\frac{\text{count}(w1)+0.5}{N+1} \quad \text{(Equation 9A)}$$

$$p(X_{w2}=1)=\frac{\text{count}(w2)+0.5}{N+1} \quad \text{(Equation 9B)}$$

$$p(X_{w1}=1, X_{w2}=1)=\frac{\text{count}(w1, w2)+0.25}{N+1} \quad \text{(Equation 9C)}$$

Missing equations may be derived from equations 9A-9C above, for example, in accordance with equations 10A-10C below:

$$P(X_{w1}=1, X_{w2}=0)=P(X_{w1}=1)-P(X_{w1}=1, X_{w2}=1) \quad \text{(Equation 10A)}$$

$$P(X_{w1}=0, X_{w2}=1)=P(X_{w2}=1)-P(X_{w1}=1, X_{w2}=1) \quad \text{(Equation 10B)}$$

$$P(X_{w1}=0, X_{w2}=0)=P(X_{w2}=0)-P(X_{w1}=1, X_{w2}=0) \quad \text{(Equation 10C)}$$

Computing mutual information across all word pairs in inference data (e.g., inference data 891 of FIG. 8J, as further discussed herein) may require computation for hundreds of thousands word pairs. Even if it could be computationally feasible, inevitably many found relations may not be useful. A first step before mining concepts may be to select candidate words (e.g., word candidates 892 of FIG. 8J, as further discussed herein) for mining. Top N words (e.g., list 893 of FIG. 8J of most frequent words, as further discussed herein) over an entire inference data period may be selected for concept identification. In one example, approximately 30-50 words may be selected which may lead to approximately 450-1250 possible pairs. Before finding most frequent words for each language, filtering may be applied to discard all sentences with unknown language as indicated by the language detector, short messages which have only one word may be skipped, text may be cleaned (e.g., to remove casing discrepancies), and/or numbers, digits, and/or special characters may be removed. It will be understood that some such filtering may have been done during language detection.

Figures 8A, 8B:
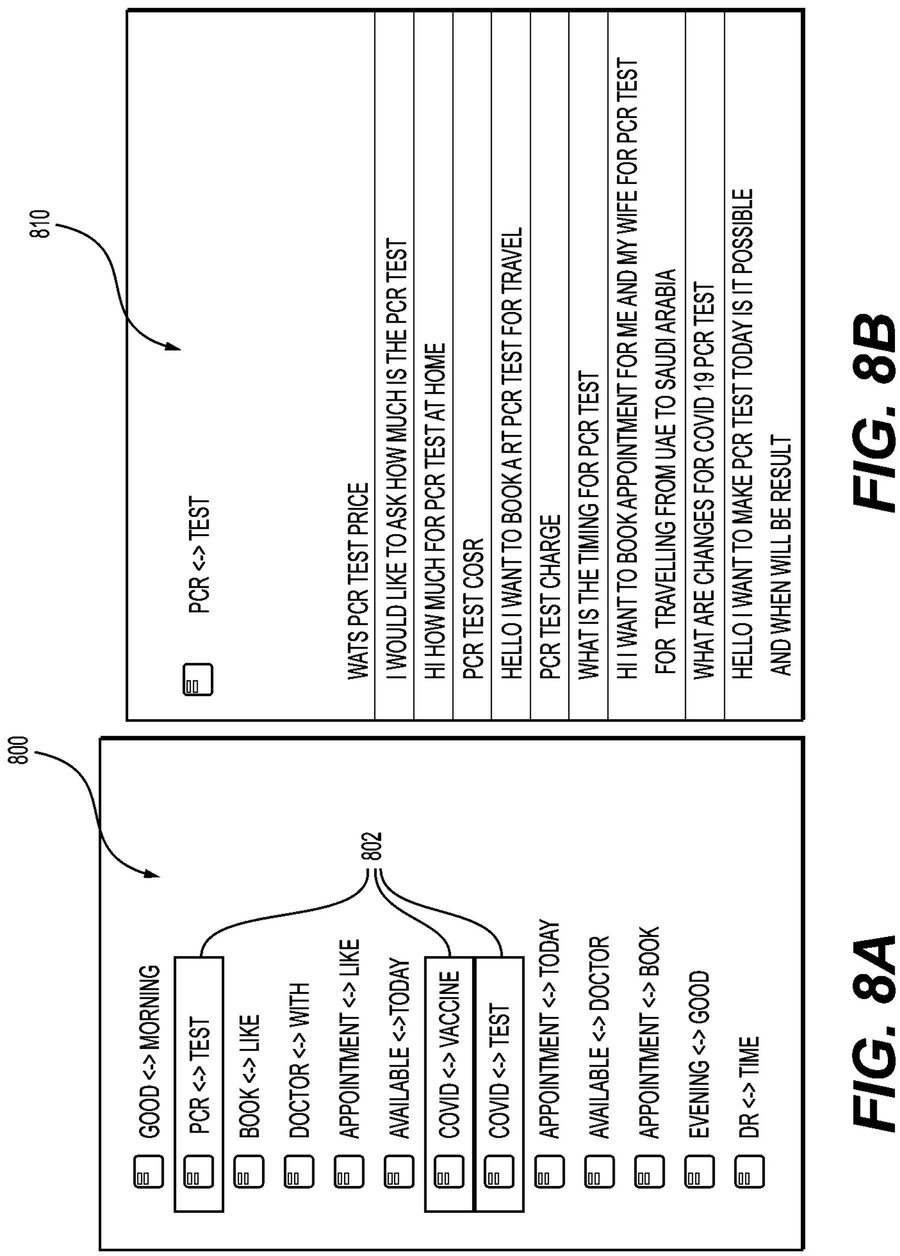
FIG. 8A is a GUI depicting a list of word-pair concepts, according to one or more embodiments.
FIG. 8B is a GUI depicting a list of messages related to a word-pair concept, according to one or more embodiments.

FIG. 8A depicts example word-pairs 800 that may be identified from a hospital chatbot. The word-pairs in FIG. 8A may represent the most frequent word-pairs and concepts from hospital chatbot conversations over a period of time from early 2022 to the middle of 2022. Topics related to the COVID-19 pandemic (e.g., pcr<->test, covid<->vaccine, and covid<->test) are among the most frequently discussed topics, as shown by the word-pairs 802 highlighted in blue outlines. FIG. 8B depicts example messages 810 entered by chatbot users in chat sessions related to a particular word-pair concept, which in this case is "pcr<->test."

Figure 8D:
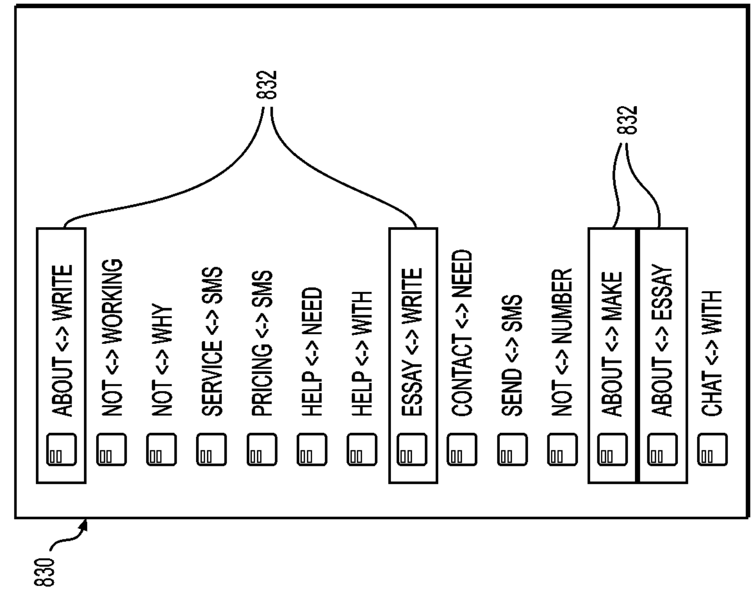
FIGS. 8C and 8D are GUIs depicting lists of word-pair concepts, according to one or more embodiments.
Figure 8C:
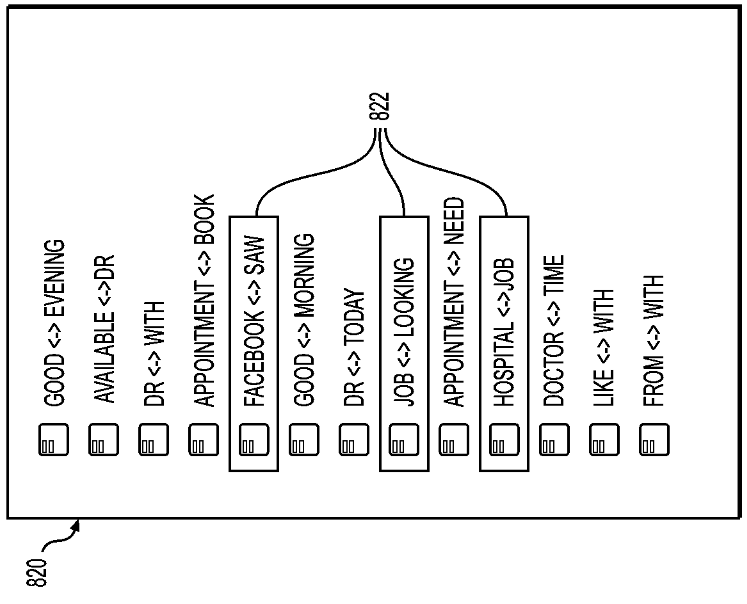

FIG. 8C depicts additional example word-pairs 820 for the same hospital chatbot but represents the most frequent word-pairs and concepts discussed in conversations over a period of time from late 2022 to early 2023. As shown by the flagged word-pairs 822, there is little mention of COVID-19, but instead, chatbot users appear to be inquiring about jobs at the hospital. Accordingly, it may be inferred that based on current events, interest in different topics increased or decreased and a chatbot may be retrained based on these changes. Training a chatbot with actual chatbot user messages allows for real-time retraining, which may maintain the relevance of a given chatbot, resulting in increased performance and customer satisfaction.

Figure 8E:
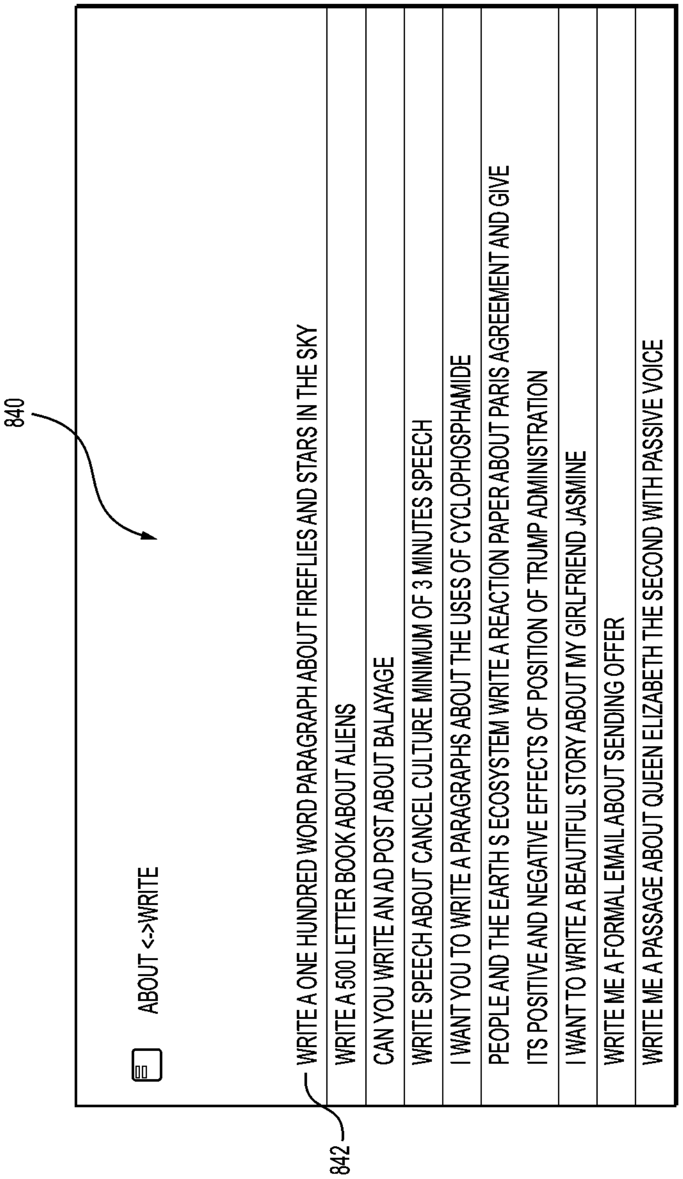
Figure 8G:
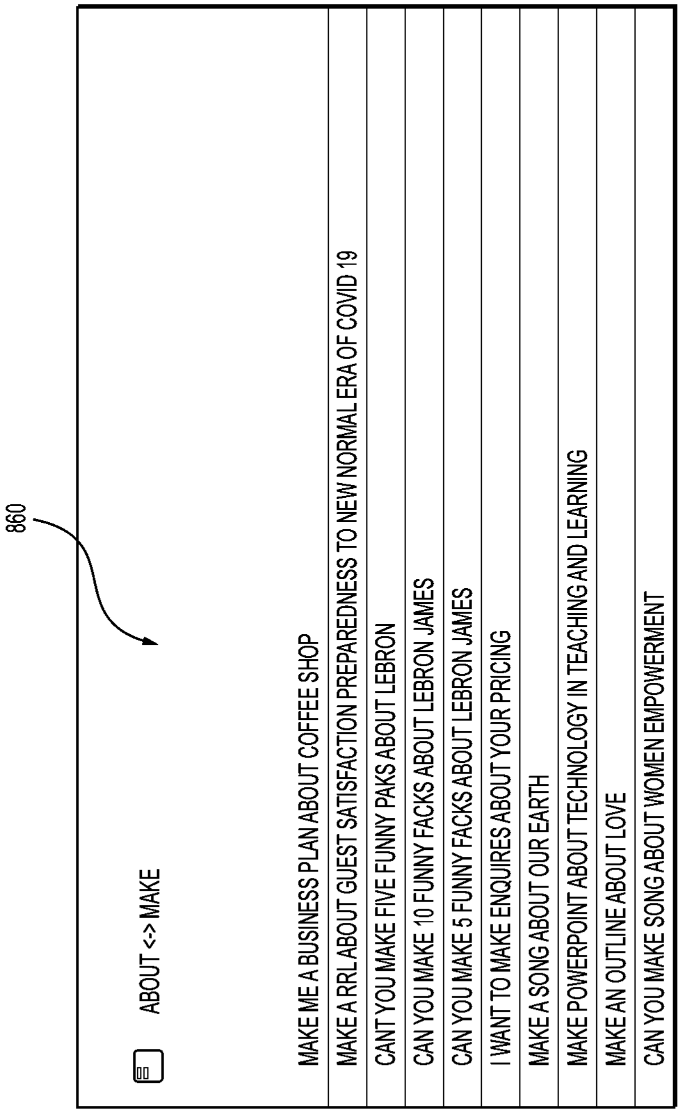
Figure 8H:
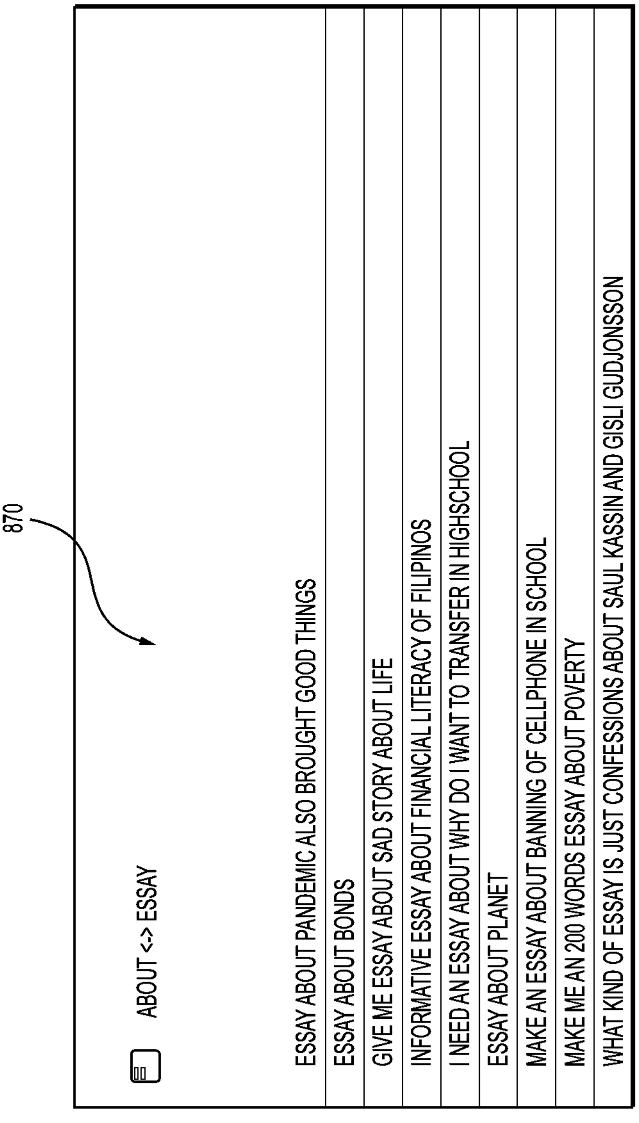

FIG. 8D depicts example word-pairs 830 for a demonstration chatbot. As shown by the frequent word-pairs 832, frequent chatbot user messages are related to writing an essay, suggesting that chatbot users are asking the chatbot to write an essay, as if the chatbot were an LLM. FIGS. 8E-8H depict example messages 840, 850, 860, and 870 related to the flagged word-pair concepts (e.g., frequent word-pairs 832). For example, FIG. 8E shows a list of chatbot user messages that are related to the word-pair "about <->write." For example, a chatbot user may have input a request message 842 during a conversation with a chatbot to "write a one hundred word paragraph about fireflies and stars in the sky." This message, along with one or more messages may be used to determined that a common pair of words used during conversations for a particular chatbot is "about" and "write." FIG. 8F shows a list of chatbot user messages related to the word-pair "essay<->write." FIG. 8G shows a list of chatbot user messages related to "about<->make." And FIG. 8H shows a list of chatbot user messages related to "about<->essay." As shown in the examples shown in FIGS. 8E-8H, messages may be requests for the demonstration chatbot to write an essay, a paragraph, speech, email, etc. The demonstration chatbot may not have been trained to perform any of these tasks and therefore, the chatbot may be retrained to respond to these types of requests.

New topics may be detected after a chatbot has been trained, where the new topics were not or could not be foreseen during generation of the training phrases and intents for the chatbot. The application of this analysis, as discussed, may cause output of pairs of words (e.g., new words) that are often used together in chatbot user messages. The chatbot may then be retrained based on actual chatbot user messages (e.g., instead of or in addition to lower volume and/or lower-quality phrases during an initial training phase).

A GUI may be used to display a list of potential concepts that meet a potential concept threshold, as shown in FIGS. 8A, 8C, and 8D. Potential concepts may include frequent word-pairs that are provided during chat sessions, and meet a use threshold. The GUI may be ordered such that each concept represented by a word-pair may be sorted by frequency, with the most frequently existing concepts being listed first. Each concept word-pair may also be ordered by ratio of frequency based on total words in the chat sessions. For example, if a pair of words are used together approximately 40 times out of approximately 4,000, a use threshold may be met, but if a pair of words are used together approximately 40 times out of approximately 80,000 words, the use threshold may not be met because the ratio of words being used together is not high enough. Each word pair of the list of word-pairs may be expanded to display the actual chatbot messages that users entered during the chat session that led to the word-pair being identified as a frequent concept, as shown in FIGS. 8B and 8E-8H. The frequency of the concepts relative to the other concepts may be displayed. The number of concepts shown may be a predefined number N of top concepts with strongest mutual information. The number may also correspond to all concepts with a frequency above some predefined threshold, which may be known as a potential concept threshold.

As top N words are sampled to mine concepts, in some cases, those which appear over an entire period of time may be prioritized. Accordingly, there may be lag for detection of more recent concepts. Changes may be made to the algorithm to make it more dynamic. Implementation of either or all of these dynamic changes may not change the way that information is presented to the chatbot administrator.

Figure 8I:
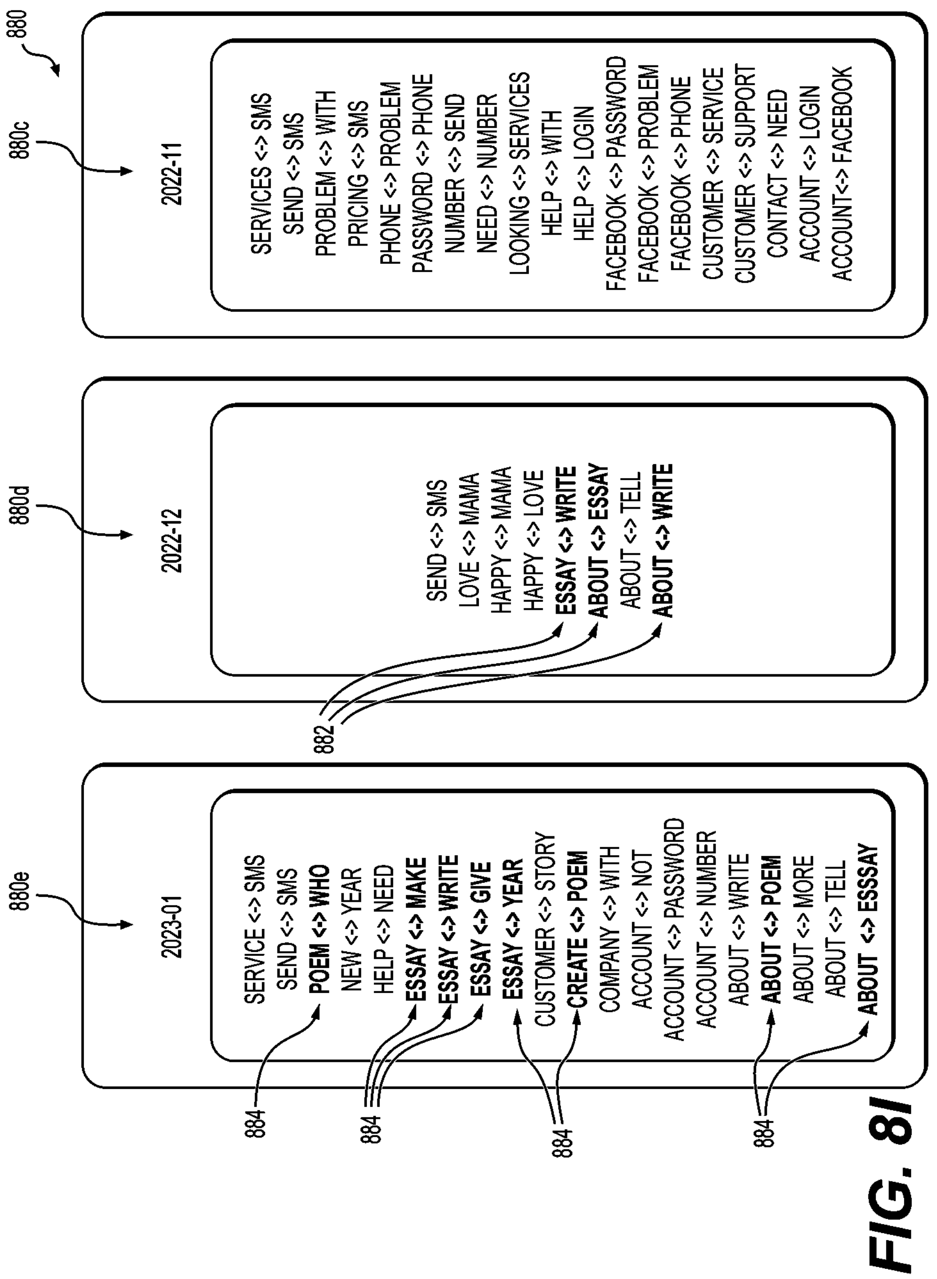
FIG. 8I is a list of word-pairs determined over a period of time, according to one or more embodiments.
Figure 8I:
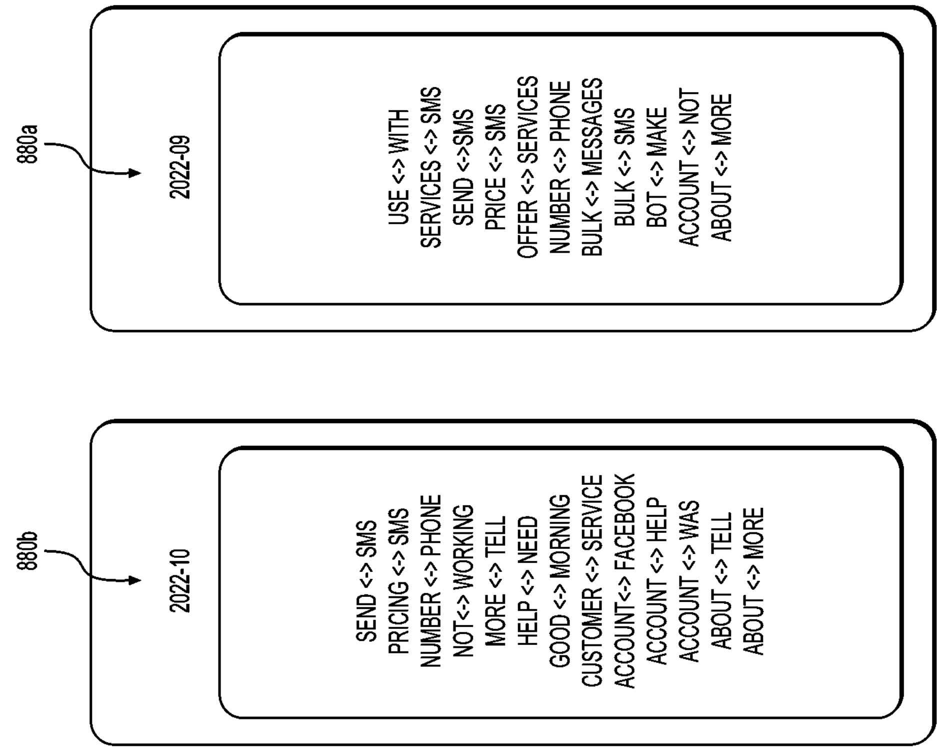

FIG. 8I depicts frequent word-pairs 880 for the demonstration chatbot of FIGS. 8D-8H, and breaks down the analysis into five consecutive months, months 880*a*-880*e*. The frequent word-pairs of FIG. 8I shows that some concepts, such as those related to text messages (e.g., short message service (SMS)) are present in each monthly period. Concepts 882 and 884 related to the example intent demonstration chatbot which users expected to behave like an LLM discussed herein only appeared in the last two months (month 880*e* and month 880*d*). For example, if the period of analysis for active learning is six months or more, the concepts related to the example LLM model may not appear, even though they are the most frequent for the most recent months.

Figure 8J:
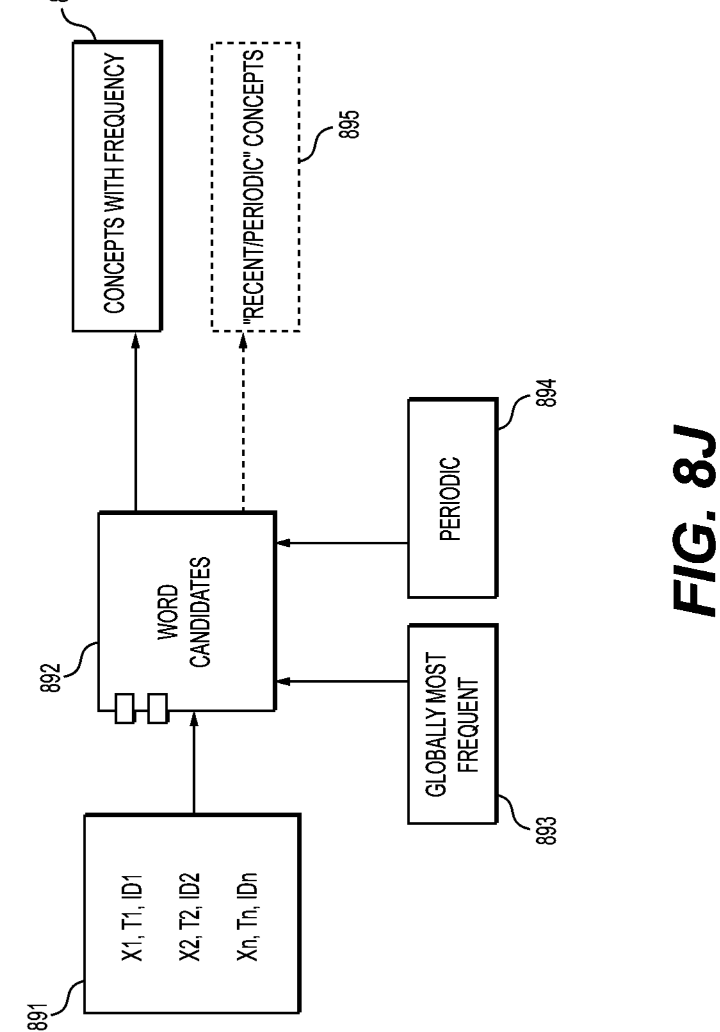
FIG. 8J is a flow diagram depicting an implementation of determining concepts, according to one or more embodiments.

FIG. 8J is a flow diagram 890 depicting an implementation of determining concepts, in accordance with one or more embodiments. Word candidates 892 for concept mining may be derived from inference data 891, the list 893 of most frequent words (e.g., top N words of inference data 891), and from recent words 894 (e.g., recent periodic word). The list 893 of most frequent words within some fixed time period may be sampled from inference data 891. A more recent fixed time period may also be sampled to derive recent words 894. If there are frequent words in this fixed time period that are not in list 893 of most frequent words, the recent sampled list (e.g., recent words 894) may be added to word candidates 892. In some cases, a separate report may be provided for recent words 894 showing one or more lists of recently frequent words (e.g., concepts, word-pairs) in comparison to, for example, the global list 893. Concepts 896 (e.g., word-pairs) with frequency above a threshold may be determined from word candidates 892.

In some instances, more weight may be added to more recent word frequencies rather than less recent word frequency. As an example, weekly or monthly periods may be used. Concepts 895 may be determined using word candidates 892 specifically from recent periods. Concepts 896 may also be determined due to a use frequency above a threshold. In some embodiments, for each word, a weighted moving average may be computed for a word's frequency and the top N words may be used to form a list of candidates (e.g., word candidates 892) for concept mining. The following equation shows how a weighted moving average may be computed:

$$WMA = \frac{freq_1 \times n + freq_2 \times (n-1) + \ldots\ freq_n}{\frac{n \times (n+1)}{2}}$$

Similar to a weighted moving average, the moving average may be exponential, giving exponentially more weight to recent frequent words:

$$EMA = freq_t \times k + SMA_y \times (1-k)$$

Instead of only using the top N most frequent words, candidates may be sampled around different percentiles. In some cases, the candidates may be sampled around percentiles up to a median.

Words that are naturally most frequent may be blacklisted. These words may be referred to as stop words and may be determined by collecting a list of stop words from an open-source repository, determining the most frequent words in a large database of writings (e.g., Wikipedia™), or as an assumed set of words determined by a language speaker to be common nonce words that should be excluded from the analysis. There may also be words that are known to be important concepts in a particular industry or domain. For example, words related to sports may be added to the analysis automatically for a chatbot used by a sporting goods company. Concepts that differ from those used to train the chatbot may be identified and implemented as a part of retraining of the chatbot.

Figure 8K:
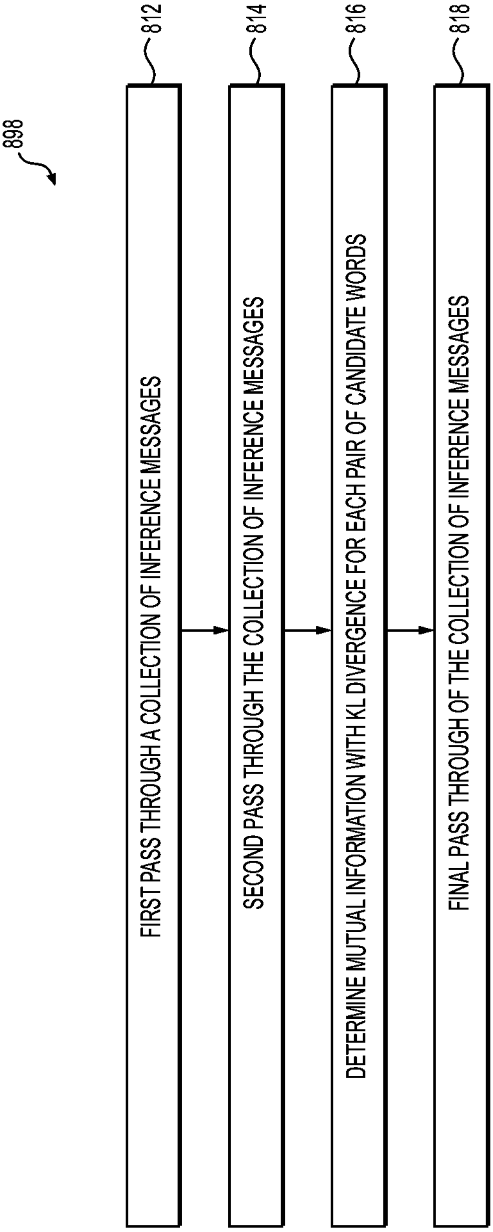
FIG. 8K is a flow diagram depicting a method for determining concepts, in accordance with one or more embodiments.

FIG. 8K is a flow diagram depicting a method 898 of an implementation of determining concepts, in accordance with one or more embodiments. A first step 812 in the implementation may include a first pass through a collection of inference messages where a count is determined count[Wi]=0. Each message may be tokenized and a counter of words may be incremented for each word in a message. The top N most frequent words may be returned as candidates. Proposed suggestions may be applied in dynamic algorithm modification.

A second step 814 may include a second pass through the collection of messages. A symbol table may be generated to store the words and the message identifier associated with each respective message. Each message may be tokenized and for words in a message, if a word is in the candidate list, the message identifier may be saved in the index for the word.

A third step 816, for each pair of candidate words where order is not important, may include determining mutual information I(X;Y) with KL divergence, as previously defined is computed. The top N concepts (words pairs with their mutual information) or all concepts with mutual information greater than a threshold may be returned. The size N is typically limited to less than 50.

A fourth step 818 may include a final pass through of the collection of messages. A symbol table may be generated and may map concepts to messages. Each message may be tokenized into a set of words. For each concept found in the third step, a check may be performed to determine if both concept words are included in tokenized set of words. If the check returns a confirmation, a message may be appended to the list of messages for the current concept.

Multiple syntagmatic relations may be combined based on their semantic similarity with various approaches such as weighted average similarity. Each concept may be represented as an average vector of sentences, computed as a component-wise average. Weighting proportional to the frequency of a sentence may be applied before averaging. Language-specific sentence encoders may be beneficial although there are multilingual options. Averaged word vectors may also be used. With each concept represented as an average semantic vector, found concepts may be merged using a greedy algorithm. All pairwise similarities may be computed where there are many similarity measures such as the following:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}} \quad \text{(Equation 11)}$$

The group of pair-wise similarities is sorted by similarity measure. The pairs may be iterated with sim(x,y)>50% in sorted order. A pair may be merged if it neither word of the pair belongs to a formed cluster. For transitive merges to an already existing cluster, all elements should be at least 50% mutually similar. A limit may be imposed on cluster size.

Figure 9:
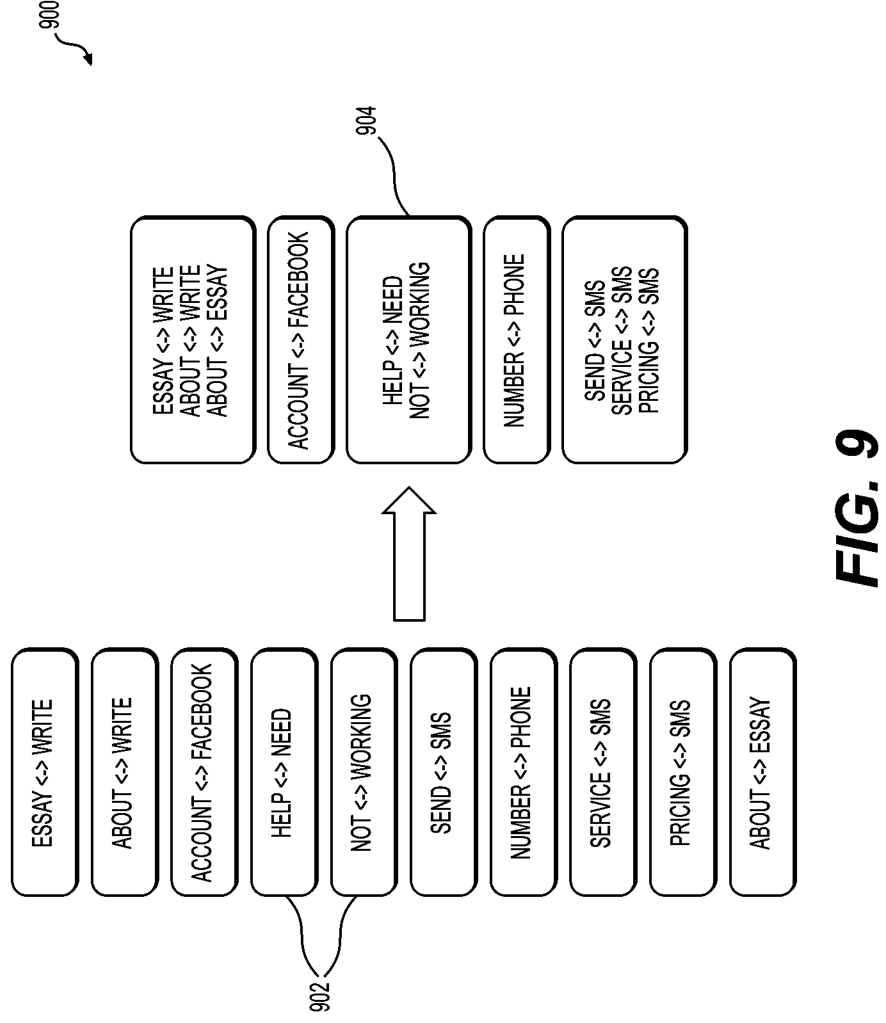
FIG. 9 is a diagram depicting an example approach of grouping concepts, according to one or more embodiments.

FIG. 9 is a diagram 900 depicting an example approach of grouping concepts. Concept word-pairs, such as word-pairs 902 may be preserved in original form after merging, but may be visually grouped together inside some shared UI element, such as element 904. Sentences within each concept may be embedded using, for example, a bag-of-words model, sentence encoders, or the like or a combination thereof. The embedding may be visualized with PCA, T-SNE, UMAP, and/or any other technique for visualization of high dimensional data, as discussed herein. Labels in the visualization may be concepts. Data points may be embedded sentences mapped into 2D or 3D vector space. Visualization may enable a user to visually identify concepts with high overlap.

During a conversation or chat session, a chatbot may receive a message from a chatbot user that does not map directly to an intent. In this case, a decision may be made to map the message to an intent, but the chatbot may flag the decision as an uncertain decision that does not meet an intent confidence. As used herein, the term "decision" refers to a decision to map a message to an intent.

Some approaches to measure uncertainty (i.e., intent confidence) include checking if a most probable label and the next one have relatively similar probability, and determining whether a top label has a probability below a threshold. It is possible that a machine learning models may be confident in a wrong decision and provide correct answers with relatively small probability, which may be referred to as fragile, or uncertain, decisions. Small changes in input data may lead to these fragile decisions, but may be improved by measures such as removing a stop word from the input text. It is desirable that a model does not depend on stop words such as "the," "a," or "or," which have low information value. These words are usually most frequent in all topics/intents. By removing one (or few for longer texts) of these stop words, the model may still provide the same answer as if no changes were made. For models trained with tokenizers which perform stop word removal, a more exhaustive list may be used than the list with which the model was trained.

Another example of small changes in the input data may be an auto-correction of a word in the input text. Auto-correction of a word to another word from training data vocabulary, or a general vocabulary, may be more likely to change intent than stop word removal. Accordingly, a small change of few characters may have a discernable impact on a decision or the training vocabulary may not be representative enough for the inference data. Auto-correction may include a synonym replacement of an unknown inference word to a known synonym in the training vocabulary, e.g., "luggage" replaced with "baggage." A Wordnet™ graph and/or sister term lookup may be used to implement such auto-correction. Auto-correction may also include spelling corrections. Efficient, constant time implementation may be achieved with a SymSpell algorithm. Spelling correction, when used with training data vocabulary, may also have an effect of stemming, e.g., "cards" (inference) replaced with "card" (in training vocabulary).

Text classification is often linearly separable and may be solved if there is available relevant training data. Therefore, another (different) model may be trained on the same training data and may be run against inference data. Messages for which two models result in a separate decision may be flagged as active learning candidates. Two different models may reach the same decision (e.g., for most instances of running the two models). For cases where two models do not reach the same decision, more inspection may be recommended (e.g., to the chatbot administrator).

Unknown labels or intents may be identified during active learning. Unknown labels and intents may refer to messages that contain all or mostly words which are not present in the training vocabulary, excluding stop words. In these cases, the model may not reach a plausible decision on the intent of the chatbot user. Transfer learning with pre-trained word or sentence embedding may be used for providing meaning to unseen words during inference. However, not all unseen words may be associated with a meaning. The message associated with an unknown label may become an active learning candidate and used to retrain the chatbot. Similar to concepts disclosed herein, unknown label messages may be ordered by frequency and may be displayed (e.g., using a GUI).

Once concepts are determined and/or merged, each concept may be associated with an existing intent or a new intent. Average semantic representation of each intent may be computed similarly when merging concepts. For each concept, a similar intent may be found and linked. If both words in a concept are missing in a training vocabulary, a new intent may be suggested with the messages from the concept as training phrases. Dialogs may be triggered when a chatbot resolves an intent from a user message, and for newly created intents, dialogs may also be created.

Figure 10:
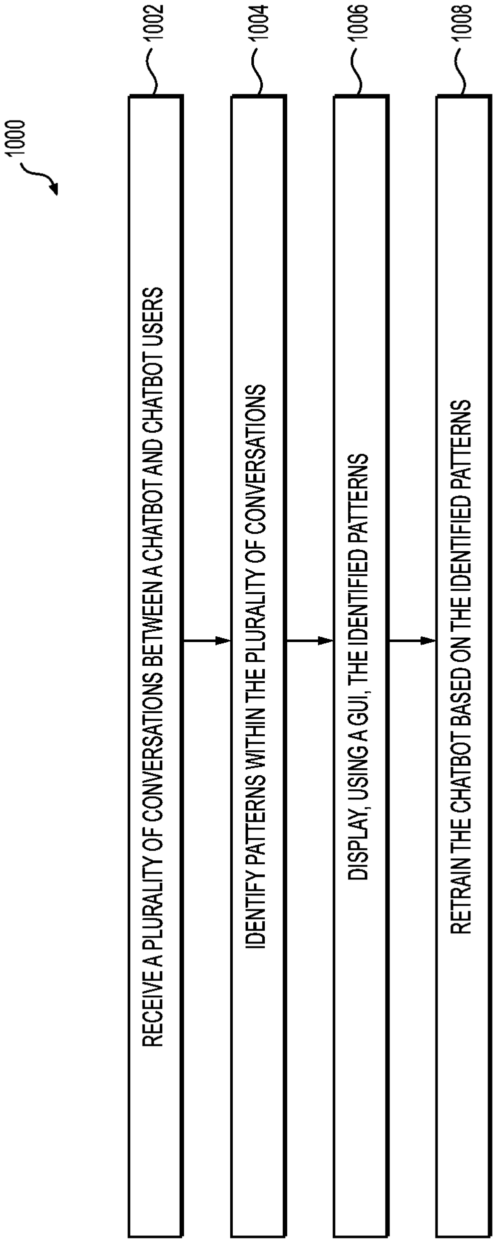
FIG. 10 is a flowchart depicting an example method for retraining a chatbot based on identified patterns, in accordance with one or more embodiments.

FIG. 10 is a flowchart depicting an example method 1000 of identifying patterns in chatbot conversations and retraining the chatbot based on the identified patterns, in accordance with one or more embodiments. At step 1002, the method 1000 includes receiving a plurality of conversations between a chatbot and a chatbot user. The plurality of conversations may include a plurality of exchanges of messages between the chatbot and the chatbot user, in accordance with embodiments disclosed herein. In some embodiments, the plurality of conversations may include one or more simulated conversations between the chatbot and another bot.

At 1004, the method 1000 includes identifying patterns within the plurality of conversations received at step 1002. Identified patterns may include conversation paths which may include conversation exit points, in accordance with one or more disclosed embodiments. Further, the patterns may include potential concepts (e.g., word-pairs), as disclosed herein.

At 1006, the method 1000 includes displaying the identified patterns using a GUI. The GUI may include graphics that illustrate the patterns in a manner that is visually understandable to a chatbot administrator.

At 1008, the method 1000 includes retraining the chatbot based on the identified patterns. The retraining may be done manually by a chatbot administrator following a review of the identified patterns, including a review of any of the displayed patterns using the GUI. The retraining may also be done automatically without any intervention and/or substantial intervention from a chatbot administrator.

It should be understood that embodiments in this disclosure are exemplary only, and that other embodiments may include various combinations of features from other embodiments, as well as additional or fewer features.

Figure 11:
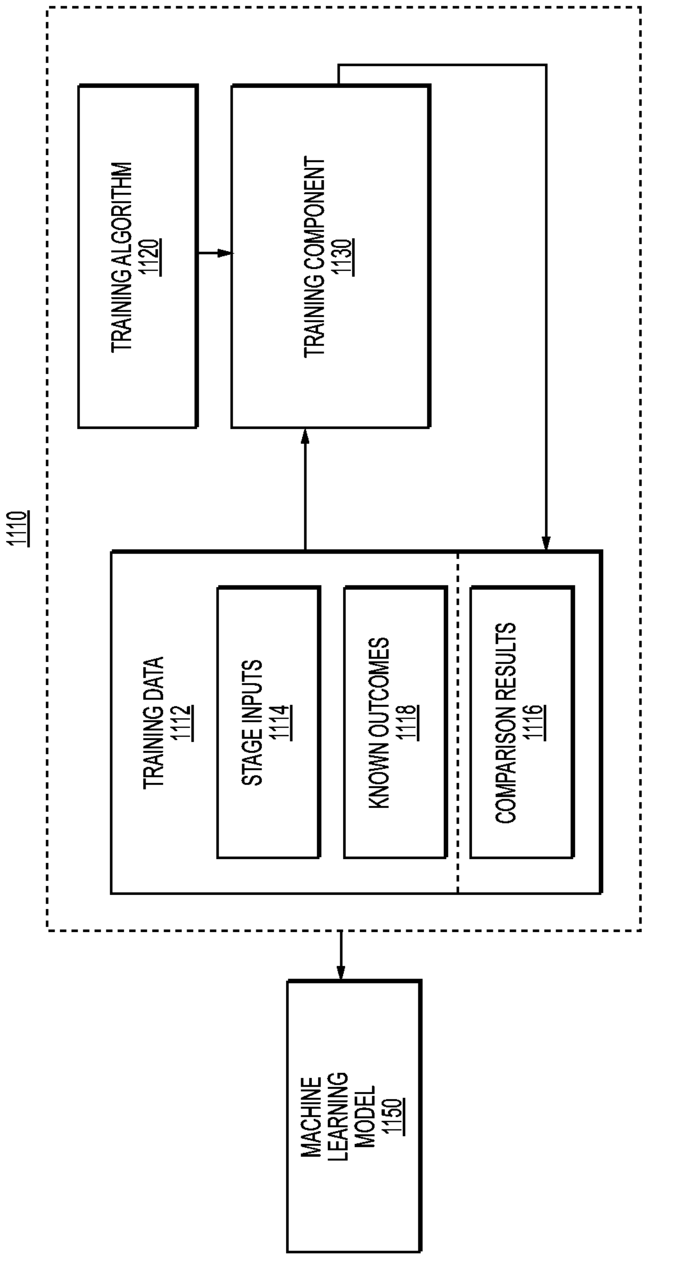
FIG. 11 depicts a flow diagram for training a machine learning model, according to one or more embodiments.

One or more implementations disclosed herein may be applied by using a machine learning model. A machine learning model as disclosed herein may be trained using the flow diagrams, systems, data and/or components disclosed in relation to FIGS. 1A-10. As shown in flow diagram 1110 of FIG. 11, training data 1112 may include one or more of stage inputs 1114 and known outcomes 1118 related to a machine learning model to be trained. The stage inputs 1114 may be from any applicable source. The known outcomes 1118 may be included for machine learning models generated based on supervised or semi-supervised training. An unsupervised machine learning model might not be trained using known outcomes 1118. Known outcomes 1118 may include known or desired outputs for future inputs similar to or in the same category as stage inputs 1114 that do not have corresponding known outputs.

The training data 1112 and a training algorithm 1120 may be provided to a training component 1130 that may apply the training data 1112 to the training algorithm 1120 to generate a trained machine learning model 1150. According to an implementation, the training component 1130 may be provided comparison results 1116 that compare a previous output of the corresponding machine learning model to apply the previous result to re-train the machine learning model. The comparison results 1116 may be used by the training component 1130 to update the corresponding machine learning model. The training algorithm 1120 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 1110 may be a trained machine learning model 1150.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes and/or systems or components illustrated in FIGS. 1-11, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. A memory of the computer system may include the respective memory of each computing device of the plurality of computing devices.

Figure 12:
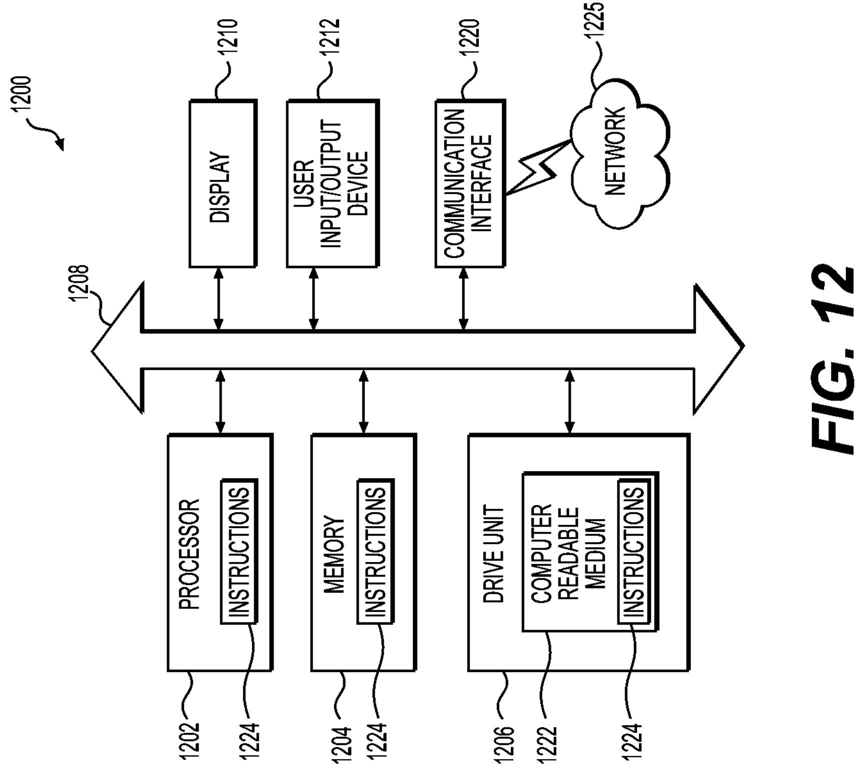
FIG. 12 depicts an example of a computing system, according to one or more embodiments.

FIG. 12 is a simplified functional block diagram of a computer system 1100 that may be configured as a device for executing the techniques disclosed herein, according to exemplary embodiments of the present disclosure. Computer system 1100 may generate features, statistics, analysis, and/or another system according to exemplary embodiments of the present disclosure. In various embodiments, any of the systems (e.g., computer system 1200) disclosed herein may be an assembly of hardware including, for example, a data communication interface 1220 for packet data communication. The computer system 1200 also may include a central processing unit ("CPU") 1202, in the form of one or more processors, for executing program instructions 1224. The computer system 1200 may include an internal communication bus 1208, and a storage unit 1206 (such as ROM, HDD, SDD, etc.) that may store data on a computer readable medium 1222, although the computer system 1200 may receive programming and data via network communications (e.g., over a network 1225). The computer system 1200 may also have a memory 1204 (such as RAM) storing instructions 1224 for executing techniques presented herein, although the instructions 1224 may be stored temporarily or permanently within other modules of computer system 1200 (e.g., processor 1202 and/or computer readable medium 1222). The computer system 1200 also may include input and output ports 1212 and/or a display 1210 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. In addition, the presently disclosed embodiments may be applicable to any type of Internet protocol.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A computer-implemented method for identifying patterns in chatbot conversations and retraining a chatbot based on the identified patterns, the method comprising:
- receiving a plurality of conversations between the chatbot and chatbot users;
- providing the plurality of conversations to a machine learning model trained to identify patterns based on the plurality of conversations;
- identifying patterns within the plurality of conversations based on an output of the machine learning model, the identified patterns including analysis indications representing (i) an autocorrect usage, the autocorrect usage including a ratio of the plurality of conversations between the chatbot and the chatbot users, including at least one auto-corrected word, (ii) a percentage of languages among the plurality of conversations, detected by the chatbot, (iii) a percentage of messages classified as long messages among the plurality of conversations, wherein each of the messages classified as long messages has a length greater than three standard deviations of an average message length, and (iv) potential concepts that meet a potential concept threshold, wherein the potential concepts comprise a pair of words from the plurality of conversations that meet a use threshold;
- determining first messages among the plurality of conversations that are associated with unknown intents;
- displaying, using a graphical user interface (GUI), the identified patterns including each of the analysis indications; and
- retraining the chatbot based on the displayed identified patterns including each of the analysis indications and based on at least one of the first messages, to improve performance of the chatbot.

2. The method of claim 1, wherein the identified patterns comprise conversation paths, the conversation paths including conversation exit points.

3. The method of claim 1, wherein the identified patterns comprise conversation paths, the conversation paths including conversation exit points, the method further comprising:
- generating a graphic visually depicting the conversation paths;
- providing the graphic to a multimodal large language model for analysis; and
- receiving a multimodal large language model output from the multimodal large language model, wherein retraining the chatbot comprises training the chatbot based on the multimodal large language model output.

4. The method of claim 1, wherein the analysis indications further represent:
- (iv) an entity distribution indicating whether the chatbot is using named entity recognition (NER) attributes as intended; and
- (v) a percentage of words unknown to the chatbot; and
- wherein the method further comprises generating the analysis indications.

5. The method of claim 1, wherein the identified patterns comprise potential concepts that meet a potential concept threshold.

6. The method of claim 1, wherein the identified patterns comprise potential concepts that meet a potential concept threshold, the method further comprising:
- determining decisions that do not meet an intent confidence, wherein messages associated with the decisions are derived from the plurality of conversations;
- displaying, using the GUI, the determined decisions; and
- retraining the chatbot further based on at least one of the determined decisions.

7. A system for identifying patterns in chatbot conversations and retraining a chatbot based on the identified patterns, the system comprising:
- a data storage device storing processor-readable instructions; and
- a processor operatively connected to the data storage device and configured to execute the instructions to perform operations that include:
  - receiving a plurality of conversations between the chatbot and chatbot users;
  - identifying patterns within the plurality of conversations, the identified patterns including analysis indications representing (i) an autocorrect usage, the autocorrect usage including a ratio of the plurality of conversations including at least one auto-corrected word, (ii) a percentage of languages among the plurality of conversations, detected by the chatbot, (iii) a percentage of messages classified as long messages among the plurality of conversations, wherein each of the messages classified as long messages has a length greater than three standard deviations of an average message length, and (iv) potential concepts that meet a potential concept threshold, wherein the potential concepts comprise a pair of words from the plurality of conversations that meet a use threshold;
  - determining first messages among the plurality of conversations that are associated with unknown intents;
  - displaying the identified patterns including each of the analysis indications; and
  - retraining the chatbot based on the displayed identified patterns including each of the analysis indications and based on at least one of the first messages, to improve performance of the chatbot.

8. The system of claim 7, wherein the identified patterns comprise conversation paths, the conversation paths including conversation exit points; wherein the analysis indications further represent:
- (iii) a percentage of languages among the plurality of conversations, detected by the chatbot;
- (iv) an entity distribution representing whether the chatbot is using named entity recognition (NER) attributes as intended; and
- (v) a percentage of words unknown to the chatbot; and
- wherein the operations further include generating the analysis indications.

9. The system of claim 7, wherein the identified patterns comprise a pair of words from the plurality of conversations that meet a use threshold.

10. The system of claim 7, wherein the processor is configured to perform operations that further include:
- determining first messages from the plurality of conversations that are associated with unknown intents;
- determining decisions that do not meet an intent confidence, wherein messages associated with the decisions are derived from the plurality of conversations;
- displaying the first messages and the determined decisions; and
- retraining the chatbot based on at least one of the first messages or on at least one of the determined decisions.

11. The system of claim 7, wherein the processor is configured to perform operations that further include:

determining decisions that do not meet an intent confidence, wherein messages associated with the decisions are derived from the plurality of conversations;

displaying the determined decisions; and retraining the chatbot based on at least one of the determined decisions.

12. A non-transitory computer-readable medium for identifying patterns in chatbot conversations and retraining a chatbot based on the identified patterns, the non-transitory computer-readable medium storing instructions thereon that, when executed by one or more processors, cause the one or more processors to perform operations comprising:

receiving a plurality of conversations between the chatbot and chatbot users;

providing the plurality of conversations to a machine learning model trained to identify patterns based on the plurality of conversations;

identifying patterns within the plurality of conversations based on an output of the machine learning model, the identified patterns including analysis indications representing (i) an autocorrect usage, the autocorrect usage including a ratio of the plurality of conversations including at least one auto-corrected word, (ii) a percentage of languages among the plurality of conversations, detected by the chatbot, (iii) a percentage of messages classified as long messages among the plurality of conversations, wherein each of the messages classified as long messages has a length greater than three standard deviations of an average message length, and (iv) potential concepts that meet a potential concept threshold and wherein the potential concepts comprise a pair of words from the plurality of conversations that meet a use threshold;

determining first messages among the plurality of conversations that are associated with unknown intents;

displaying, using a graphical user interface (GUI), the identified patterns including each of the analysis indications; and retraining the chatbot based on the displayed identified patterns including each of the analysis indications and based on at least one of the first messages, to improve performance of the chatbot.

13. The non-transitory computer-readable medium of claim 12, wherein the identified patterns comprise conversation paths, the conversation paths including conversation exit points.

14. The non-transitory computer-readable medium of claim 12, wherein the identified patterns comprise conversation paths, the conversation paths including conversation exit points, the operations further comprising:

generating a graphic visually depicting the conversation paths;

providing the graphic to a multimodal large language model for analysis; and receiving a multimodal large language model output from the multimodal large language model, wherein retraining the chatbot comprises training the chatbot based on the multimodal large language model output.

15. The non-transitory computer-readable medium of claim 12, wherein the analysis indications further represent:

(iii) a percentage of languages among the plurality of conversations, detected by the chatbot;

(iv) an entity distribution representing whether the chatbot is using named entity recognition (NER) attributes as intended; and (v) a percentage of words unknown to the chatbot; and wherein the operations further comprise generating the analysis indications.

16. The non-transitory computer-readable medium of claim 12, wherein the identified patterns comprise potential concepts that meet a potential concept threshold.

17. The non-transitory computer-readable medium of claim 12, wherein the identified patterns comprise potential concepts that meet a potential concept threshold and wherein the potential concepts comprise a pair of words from the plurality of conversations that meet a use threshold.

18. The method of claim 1, wherein displaying the identified patterns comprises generating a graphic visually depicting conversation paths.

19. The method of claim 1, wherein displaying the identified patterns further comprises visually distinguishing dialogs to indicate a ratio of chatbot users that exit relative to those that entered.

20. The method of claim 1, further comprising filtering the plurality of conversations to remove messages meeting a short message threshold prior to identifying the patterns.

* * * * *